United States Patent
Kettula et al.

(10) Patent No.: US 11,584,033 B2
(45) Date of Patent: Feb. 21, 2023

(54) DEVICE FOR TRANSVERSALLY CUTTING CONVOLUTELY WOUND LOGS OF WEB MATERIALS

(71) Applicant: The Procter & Gamble Company, Cincinnati, OH (US)

(72) Inventors: Joseph Henry Kettula, Cincinnati, OH (US); Jonathan Lee Price, Cincinnati, OH (US); Gustav Andre Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 157 days.

(21) Appl. No.: 15/834,775

(22) Filed: Dec. 7, 2017

(65) Prior Publication Data

US 2018/0162005 A1    Jun. 14, 2018

Related U.S. Application Data

(60) Provisional application No. 62/431,862, filed on Dec. 9, 2016.

(51) Int. Cl.
| | | |
|---|---|---|
| *B26D 7/04* | (2006.01) | |
| *B26D 7/06* | (2006.01) | |
| *B23D 47/04* | (2006.01) | |
| *B26D 7/01* | (2006.01) | |
| *B26D 3/16* | (2006.01) | |
| *D21H 27/00* | (2006.01) | |
| *B26D 1/56* | (2006.01) | |

(Continued)

(52) U.S. Cl.
CPC ............. *B26D 7/04* (2013.01); *B23D 47/042* (2013.01); *B26D 1/16* (2013.01); *B26D 1/565* (2013.01); *B26D 3/16* (2013.01); *B26D 3/161* (2013.01); *B26D 7/01* (2013.01); *B26D 7/015* (2013.01); *B26D 7/0683* (2013.01); *D21H 27/00* (2013.01); *D21H 27/002* (2013.01); *B26D 7/12* (2013.01); *B26D 2007/013* (2013.01); *B26D 2210/11* (2013.01); *B65H 2701/19* (2013.01)

(58) Field of Classification Search
CPC .. B26D 3/16; B26D 7/0683; B26D 2007/013; B26D 2210/11
See application file for complete search history.

(56) References Cited

U.S. PATENT DOCUMENTS

| | | | |
|---|---|---|---|
| 4,041,813 A | 8/1977 | Spencer | |
| 5,038,647 A * | 8/1991 | Biagiotti | .................. B26D 1/54 |
| | | | 83/155.1 |

(Continued)

FOREIGN PATENT DOCUMENTS

WO    WO01/41982 A2    6/2001

OTHER PUBLICATIONS

U.S. Appl. No. 15/834,735, filed Dec. 7, 2017, Kettula, et al.

(Continued)

*Primary Examiner* — Sean M Michalski
(74) *Attorney, Agent, or Firm* — Richard L. Alexander

(57) ABSTRACT

A log saw for cutting convolutely wound logs of web material is disclosed. The log saw includes a cutting blade operating in a cutting plane, a log saw clamp for the retention of a convolutely wound log of web material such that the convolutely wound log of web material extends in a log advancing path through to the cutting plane, and controls connected to the clamping device.

24 Claims, 11 Drawing Sheets

(51) Int. Cl.
*B26D 1/16* (2006.01)
*B26D 7/12* (2006.01)

(56) References Cited

U.S. PATENT DOCUMENTS

| | | |
|---|---|---|
| 5,167,994 A | 12/1992 | Paulson |
| 5,357,833 A | 10/1994 | Biagiotti |
| 5,509,336 A * | 4/1996 | Biagiotti ............ B23B 31/1269 |
| | | 279/109 |
| 7,617,852 B2 | 11/2009 | Perini |
| 8,037,794 B2 | 10/2011 | Ridolfi |
| 11,065,776 B2 | 7/2021 | Kettula et al. |
| 11,407,134 B2 | 8/2022 | Kettula et al. |
| 2004/0149103 A1* | 8/2004 | Rundell et al. .......... B26D 7/02 |
| | | 83/452 |
| 2006/0162517 A1* | 7/2006 | Perini ..................... B26D 3/161 |
| | | 83/37 |
| 2006/0169357 A1* | 8/2006 | Perini ..................... B26D 7/02 |
| | | 144/1.1 |
| 2007/0207293 A1 | 9/2007 | Santiago |
| 2008/0017003 A1* | 1/2008 | Hsu ....................... B23D 47/04 |
| | | 83/469 |
| 2008/0216975 A1 | 9/2008 | Farwai |
| 2012/0204691 A1* | 8/2012 | Gambini ................. B26D 7/02 |
| | | 83/84 |
| 2013/0139664 A1* | 6/2013 | Diehr et al. ............ B26D 3/16 |
| | | 83/37 |
| 2015/0298331 A1* | 10/2015 | Diehr et al. ............ B26D 3/16 |
| | | 83/37 |
| 2017/0361484 A1* | 12/2017 | Pardini ................... B25H 1/08 |
| 2018/0162004 A1 | 6/2018 | Kettula et al. |
| 2018/0162006 A1 | 6/2018 | Kettula et al. |
| 2021/0308894 A1 | 10/2021 | Kettula et al. |

OTHER PUBLICATIONS

U.S. Appl. No. 15/834,807, filed Dec. 7, 2017, Kettula, et al.
All Office Actions; U.S. Appl. No. 15/834,735.
All Office Actions; U.S. Appl. No. 15/834,807.
All Office Actions; U.S. Appl. No. 17/351,380, filed Jun. 18, 2021.

* cited by examiner

DEVICE FOR TRANSVERSALLY CUTTING CONVOLUTELY WOUND LOGS OF WEB MATERIALS

FIELD OF THE INVENTION

The present disclosure generally relates to equipment for cutting elongate convolutely wound logs of web material into shorter rolls of toilet paper, kitchen towels (e.g., all-purpose wipes), and the like. More particularly, the present disclosure relates to log saws employing a unique clamping apparatus and method for releasably securing and cutting elongate convolutely wound logs of paper web material.

BACKGROUND OF THE INVENTION

Traditional convolutely wound web material products are typically produced as elongate "logs" for reasons of ease and speed of manufacture. As used herein and in the appended claims, the term "web material" refers to any porous or non-porous product that can be found in sheet form, regardless of length or width. Preferred embodiments of the present invention described below are used with reference to operations to be performed upon elongate logs of paper web materials (i.e., including without limitation—paper toweling, bath tissue, napkins, tissues, and the like.). However, other illustrative examples of web material can include foil, film, fabric, cloth, cellophane, wrapping paper, wax paper, and the like.

As used herein, a "log", or a "log of convolutely wound web material", or a "log of web material" and other variations thereof is a convolutely wound product of any web material having any set of dimensions. Many types of paper are produced in logs for ease of manufacture. As used herein and in the appended claims, the term "convolutely wound log of web material" or "log" is meant to include rolls of paper products such as napkins, paper towels, facial tissue, toilet tissue, newsprint, and the like. However, the present disclosure is not limited to rolls of paper products. The term "convolutely wound log of web material" and the variations thereof is also meant to include rolls of products made from other materials including without limitation cellophane, plastic sheeting, and other synthetic materials, fabric, woven, and non-woven textiles and cloth, foil, etc., regardless of product porosity, density, and dimensions. Generally, elongate logs of convolutely wound web material are generally sawed into smaller rolls to be used by consumers. In many conventional log sawing devices, the sawing process generally involves a cutting blade, a clamp to hold the logs, and an advancing mechanism to move the logs. Typical automated sawing processes can utilize a reciprocating saw, or an orbital radial saw, or band saw in combination with a stationary log clamp.

FIG. 1 illustrates an exemplary prior art continuous motion log saw 20 that includes a main drive shaft 21 rotatably mounted on a frame 22. The frame includes a skew plate 23 supporting a main bearing housing 24. Bearings 25 and 26 inside of the bearing housing rotatably support the main drive shaft 21 for rotation about an axis S which is skewed relative to the linear path P along which the product to be cut is advanced. The skew axis extends at a minor acute angle, Θ, relative to the path P.

A skew arm 28 is attached to the left end of the main drive shaft 21 and supports an orbital head assembly 29. The orbital head assembly 29 includes a disc blade 30 and grinding stones 31. The invention will be explained with reference to a single disc blade and a single set of grinding stones. However, it will be understood that a log saw can include two or more blades and associated sets of grinding stones. Additionally, a log saw can incorporate any means to effectively transversely cut a log of convolutely wound web material including, but not limited to, water jets, saw blades (circular, linear, or chain), blade knives, water knives, air knives, lasers, and the like, and combinations thereof.

The orbital head assembly 29 includes an angular differentiator 35 which is rotatably mounted on the skew arm 28 for rotation about an axis, A, which is parallel to the skew axis, S. The angular differentiator includes a generally cylindrical housing 36 which is rotatably supported by bearings 37 and 38. Bearing 37 is mounted on the skew arm 28 and bearing 38 is mounted on bracket 39 which is attached to the skew arm. As the skew arm 28 is rotated by the main drive shaft 21, the angular differentiator 35 is caused to orbit in planetary motion by a sun pulley 42, a planet pulley 43, and a belt 44. The sun pulley 42 is formed as part of the stationary main bearing housing 24 and is concentric to the skew axis, S. The planet pulley 43 is mounted on an angular differentiator and is concentric to axis A. Pulleys 42, 43 and belt 44 can be provided with teeth to prevent slippage. Tension on the belt 44 can be adjusted by belt tighteners 45 and 46 which are mounted on the skew arm. The sun pulley 42, planet pulley 43, and belt 44 could be replaced by equivalent mechanisms, for example, sprockets and a chain.

A generally cylindrical grinder base 50 is rotatably mounted on the left end of the angular differentiator by a bearing 51. The grinder base is also supported by an arm 52 which is attached to the grinder base and to a bearing housing 53 which is rotatably mounted on the middle of the angular differentiator by a bearing 54. The axial centerline of the grinder base is concentric to axis B, which is parallel to path P and remains so during the entirety of the orbit by virtue of the planetary motion of the angular differentiator.

An elongated blade arbor or shaft 56 is rotatably supported inside of the grinder base by bearings 57 and inside of the angular differentiator by bearing 58. The axis of the blade arbor is aligned with the axis B. The disc blade 30 is mounted on the left end of the blade arbor and extends in a plane which is perpendicular to the path P.

Grinding stones 31 can be attached to the grinder base 50 by a support arm 61. The grinding stones are mounted radially inwardly of the blade and the grinder base, and a retaining guide 62 positions and holds the grinding stones radially inwardly throughout the orbit as it moves parallel to axis B within retainer arms 63. The retainer arms are attached to the skew arm 28. The grinding stones are driven by a conventional air motor 64 for sharpening the blade at the appropriate time during the cycle.

The disc blade 30 is driven by a blade drive motor 68 and an intermediate drive assembly 69. The intermediate drive assembly includes a pulley 70 which is rotatably mounted on the main bearing housing 24 by bearings 71 and 72. The pulley 70 is mounted on the main bearing housing so that the axis of rotation of the pulley is aligned with an axis E which is eccentric (i.e., offset and parallel) with respect to the skew axis S. The amount of eccentricity is dependent on the skew angle, Θ, in conjunction with the position of the intersection of axes A, B.

The intermediate drive assembly 69 can also include a pulley 74 mounted on the right end of the blade arbor 56. Pulley 75 is mounted on the drive shaft of the blade drive motor 68 and is connected to the pulley 70 by belt 76. The pulley 70 is connected to the pulley 74 on the blade arbor by belt 77.

The planetary motion of the orbit head compensates for the skew angle and ensures that the disc blade 30 remains perpendicular to the path P throughout the orbit. Rotatably mounting the grinder base on the angular differentiator ensures that the grinding stones remain radially inwardly of the disc blade throughout the orbit. The distance between the grinding stones and the skew axis remains substantially constant throughout the orbit. Centrifugal forces on the grinding stones are thereby reduced, and cyclic loading is substantially eliminated.

Logs of paper product are often not very strong radially and are typically clamped to provide support and to prevent the logs from being crushed by the saw. Such logs are preferably clamped on both sides of the blade to facilitate a straight cut through the logs. Most prior art clamps use elastic straps, flexible cylindrical strips, guide troughs, semi-cylindrical shells, or grippers to support a log during the sawing process.

Exemplary current log clamping mechanisms are disclosed in U.S. Pat. Nos. 5,509,336; 5,357,833; 5,647,259; 5,038,647; 5,315,907; and 3,049,954. All current clamping assemblies have one or more significant design limitations. Exemplary problems, or limitations, in these prior art designs include generally weaker designs, speed limitations caused by inherently slower designs and frictional engagement, excessive wear and stress on parts, and complex assemblies requiring numerous parts. Weaker log clamp designs typically result in clamps that are difficult to adjust or ineffectively clamp. Prior art clamping devices allow slight movement during the clamping process that can cause bias cutting (product flaws). Some prior art clamping devices apply uneven pressure around the circumference of the log causing log deformation resulting in bias cutting or product flaws. Bias cutting and inadequate clamping of the log reduce the yield of these prior art sawing processes. Tremendous pressure is placed on the saw blade as it cuts into the log because the saw blade is normally toothless to avoid shredding the log. Thus, the cutting process requires greater force to shear the log than a process involving a blade with teeth, increasing bias cutting and log core crushing problems.

Because upstream equipment is usually capable of producing logs of varying diameter, the clamps should be manually or automatically adjustable to accommodate logs having different diameters. However, several prior art clamps are not easily adjustable. Those prior art clamps that are adjustable generally require extra tooling or screws to set the clamps in desired positions.

For example, a semi-cylindrical shell clamp generally has one fixed side and one spring-loaded resiliently mounted side. The spring-loaded resiliently mounted side requires the adjustment of small screws to alter the compression of the spring and the diameter of the clamp. This system of adjustment requires the operator to stop the saw while changing the setting because of the proximity of the screws to the saw. The semi-cylindrical shell device can only accommodate slight changes in log diameter due to the small range of movement of the resiliently mounted side. Because there are only two shells, a large variation in the log diameter causes the edges of the shells to cut into a larger log, while a smaller log does not receive an adequate clamping force and clamp forces would be undesirably concentrated. Either one of these situations can cause product flaws.

Additionally, vertical clamp adjustment can be problematic. In most conventional log saws, the log is advanced on guides at a fixed height. These guides support the bottom of the log. When logs of varying diameter are passed through the system, the bottoms of the logs are each located at a constant height rather than the centers of the logs. Some prior art clamps can be adjusted to change the diameter of the clamp while keeping the center of the clamp unmoved. When the diameter of such a clamp is adjusted, the bottom of the clamp must move. Therefore, these clamps must be mounted to move vertically as well as radially to align the bottom of the clamp diameter with the bottom of the incoming log. This extra motion step makes adjustments more time consuming and complicates the clamp design.

Additionally, most prior art clamps can be grouped into two general categories: constant pressure clamps and intermittent clamps. Constant pressure clamps use a spring or other resilient member to apply constant pressure on the log or to provide a resilient restraining structure about the log. Intermittent clamps only clamp the log during cutting operations and then release to allow the log to advance forward for the next cut. Intermittent clamps experience rapid cycle times between the clamp and release positions. This constant cycling creates two major problems: speed limitations and increased wear on parts. Because the intermittent clamps must clamp the log for each cut and then release the log for advancement, the speed of the log saw is limited by the speed of the clamp. Even with rapid cycle times, log saws with intermittent clamps are slower than log saws with constant pressure clamps.

Due to the rapid cycle times of intermittent clamps, parts are exposed to wear and tear from constant rubbing. For example, adjustable clamps that utilize flexible cylindrical strips and elastic strap clamps experience excessive wear and friction between adjacent parts. This style of clamp includes an elastic belt that is pulled down over two contacting strips with rapid cycle times to clamp the logs. The constant friction between the belt and the strips slows the clamp's adjustment to different diameter logs and can cause the belt to wear out. Additionally, these clamps may allow slight movement during the sawing process, especially for logs of large diameter and heavy density. A clamp should hold the log stable when the blade applies large forces while penetrating the log. As shown in FIG. 2, the elastic belt only contacts a portion of the circumference of the log. This unevenly applied pressure causes the log to deform as depicted from a purely circular cross-section and can result in an uneven, or biased, cut.

In order to possess flexible properties, the strips must be relatively thin. Due to the thin construction of the strips, the strips are easily bent or damaged. The flexible strips also can suffer from plastic deformation and lose their resistive properties because of the constant cycling. These strips are especially likely to deflect when a hard log is clamped. As a result of the above limitations, these parts may need to be frequently replaced.

Additionally, highly compressible logs of web material can cause significant, and even catastrophic, log saw failures. It has been observed that highly compressible logs of web material require additional force by the log saw blade in order to completely sever the web material as compared to logs of web material that are not compressible. Without desiring to be bound by theory, it is believed that the interaction between the log saw blade and the log of web material involves two main physical phenomena, local deformation and fracture. As soon as the log saw blade contacts the log of web material, the log of web material locally deforms. When the deformation reaches a desired level, fracture occurs and the log of web material is separated. Highly compressible logs of web material experience a higher degree of deformation; less compressible logs of web material experience a lower degree of deformation. Since highly compressible logs of web material experience a higher degree of deformation, the log saw blade exerts more force on the log to reach the point in the deformation process where fracture occurs. The additional force exerted by the log saw blade causes the blade to elastically deform locally. Repeated elastic blade deformation can cause structural weakening of the blade and eventual plastic deformation. A plastically deformed log saw blade can contact portions of the log saw clamping assembly causing catastrophic log saw blade failure and significant damage to the clamping assembly requiring significant downtime to effect repairs. Further, a rotating log saw blade has significant inertia. A plastically deformed log saw blade having high inertia can shatter after contact—a clearly dangerous situation. A log saw clamp that can effectively contain highly compressible logs of web material can suitably alleviate these manufacturing issues.

One of skill in the art will readily appreciate that wear and tear on parts is closely related to the problem of overly complex designs. Numerous small parts and assemblies are difficult to access in the log clamp device. Complex designs are relatively expensive to manufacture, assemble, maintain, and repair. The deterioration of parts due to friction and wear creates significant maintenance problems of accessing small and often concealed parts and replacing them in close quarters. Replacing parts is time consuming and can require the log saw to be stopped while performing maintenance. The inability to consistently run the log saw therefore costs the manufacturer a significant amount of money and increases machine inefficiency.

In light of the problems and limitations as described supra, a need exists for a log saw clamp that is easily adjustable, substantially rigid, strong, effectively clamps the log, does not require that logs be slowed during cutting operations, has relatively few moving parts, does not have an overly complex design with small intricate parts, has a design permitting ease of manufacture and maintenance, is easy to adjust without requiring system shutdown, and which has a minimum number of moving parts subject to wear. Each embodiment of the present disclosure achieves one or more of these results. Such a new clamping method and apparatus that provides this enhanced performance and results in improved product quality would be clearly be welcomed by those in the art.

SUMMARY OF THE INVENTION

The present disclosure provides for a log saw for cutting convolutely wound logs of web material. The log saw comprises a cutting blade operating in a cutting plane, a log saw clamp for the retention of a convolutely wound log of web material such that the convolutely wound log of web material extends in a log advancing path through to the cutting plane, and control means connected to the clamping device. The log saw clamp comprises a support structure having a first and second cam disposed therein, a pair of opposed first and second paddles, and a first and second linkage. The convolutely wound log of web material is disposable between the pair of opposed first and second paddles. Each paddle of the pair of opposed paddles are capable of contacting engagement with a surface of the convolutely wound log of web material. Each of the first and second linkages having a cam follower disposed thereon. Each cam follower of the first and second linkages is connectively and operatively engageable with the first and second cam, respectively, and each of the first and second linkages are operatively and fixably connected to the first and second paddles, respectively, at a distal end thereof. A force applied to both of the first and second linkages causes each of the cam followers to translate within the respective first and second cams disposed within the support structure. Each of the cam followers causes the respective first and second linkage to cause the respective first and second paddles operably and fixably attached to the distal end thereof to translate relative to the convolutely wound log of web material.

The present disclosure also provides for a log saw for cutting convolutely wound logs of web material. The log saw comprises a cutting blade operating in a cutting plane, a log saw clamp for temporarily restraining a convolutely wound log of web material such that the convolutely wound log of web material extends in a log advancing path through to the cutting plane, and control means connected to the clamping device. The log saw clamp comprises a pair of opposed first and second paddles operatively connected to a respective first and second linkage. The convolutely wound log of web material is disposable between the pair of opposed first and second paddles. Each paddle of the pair of opposed paddles is capable of contacting engagement with a surface of the convolutely wound log of web material. A force applied to both of the first and second linkages causes each of the respective first and second paddles to translate relative to the convolutely wound log of web material.

DETAILED DESCRIPTION

As used herein, the term "machine direction" (MD) refers to that direction which is parallel to the flow of the component materials used for the formation of absorbent articles through manufacturing equipment. The "cross-machine direction" (CD) is perpendicular to and co-planar with the machine direction. The "Z-direction" refers to that direction that is orthogonal to both the MD and CD. As used herein, the term MD corresponds with the term "y-axis." As used herein, the term CD corresponds with the term "x-axis." As used herein, the term Z-direction corresponds with the term "z-axis."

Figure 1:
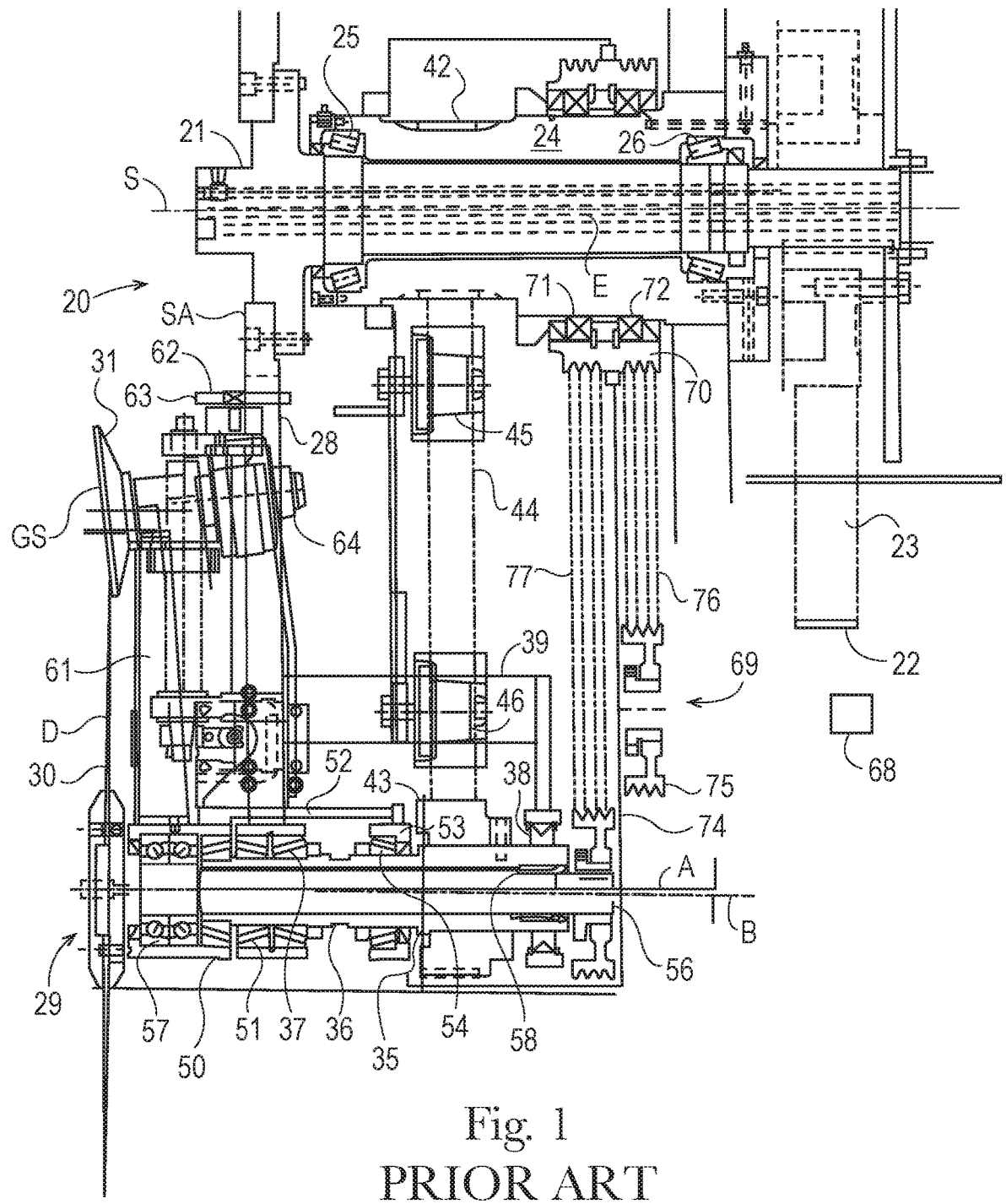
FIG. 1 is a fragmentary side elevational view of an exemplary prior art continuous motion log saw.
Figure 2:
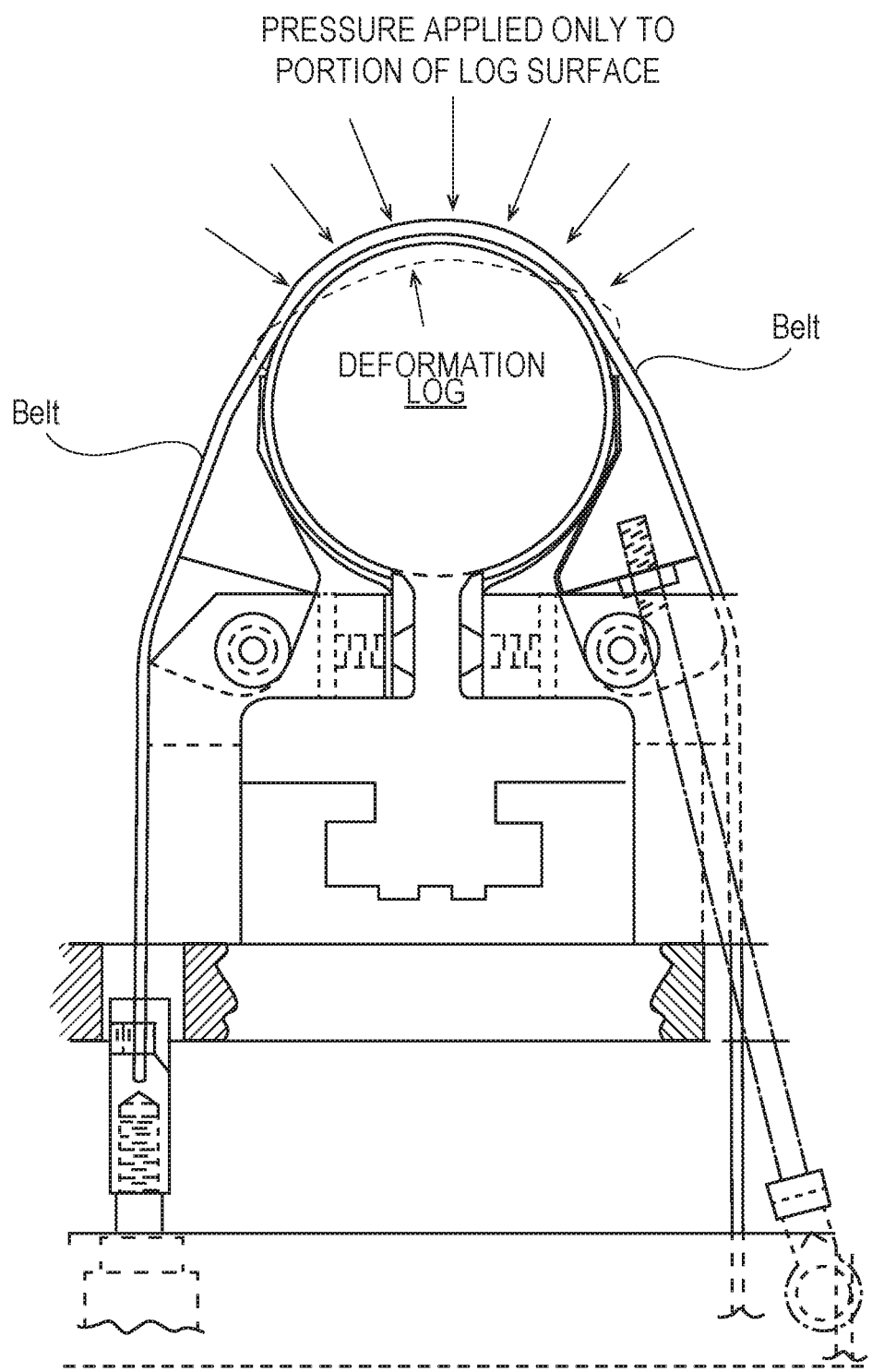
FIG. 2 is a cross-sectional view of an exemplary prior art log saw clamping assembly utilizing an elastic belt pulled down the log and contacting only a portion of the circumference of the log causing the log to deform from a purely circular cross-section result in a cut portion having an uneven, or biased, cut.
Figure 3:
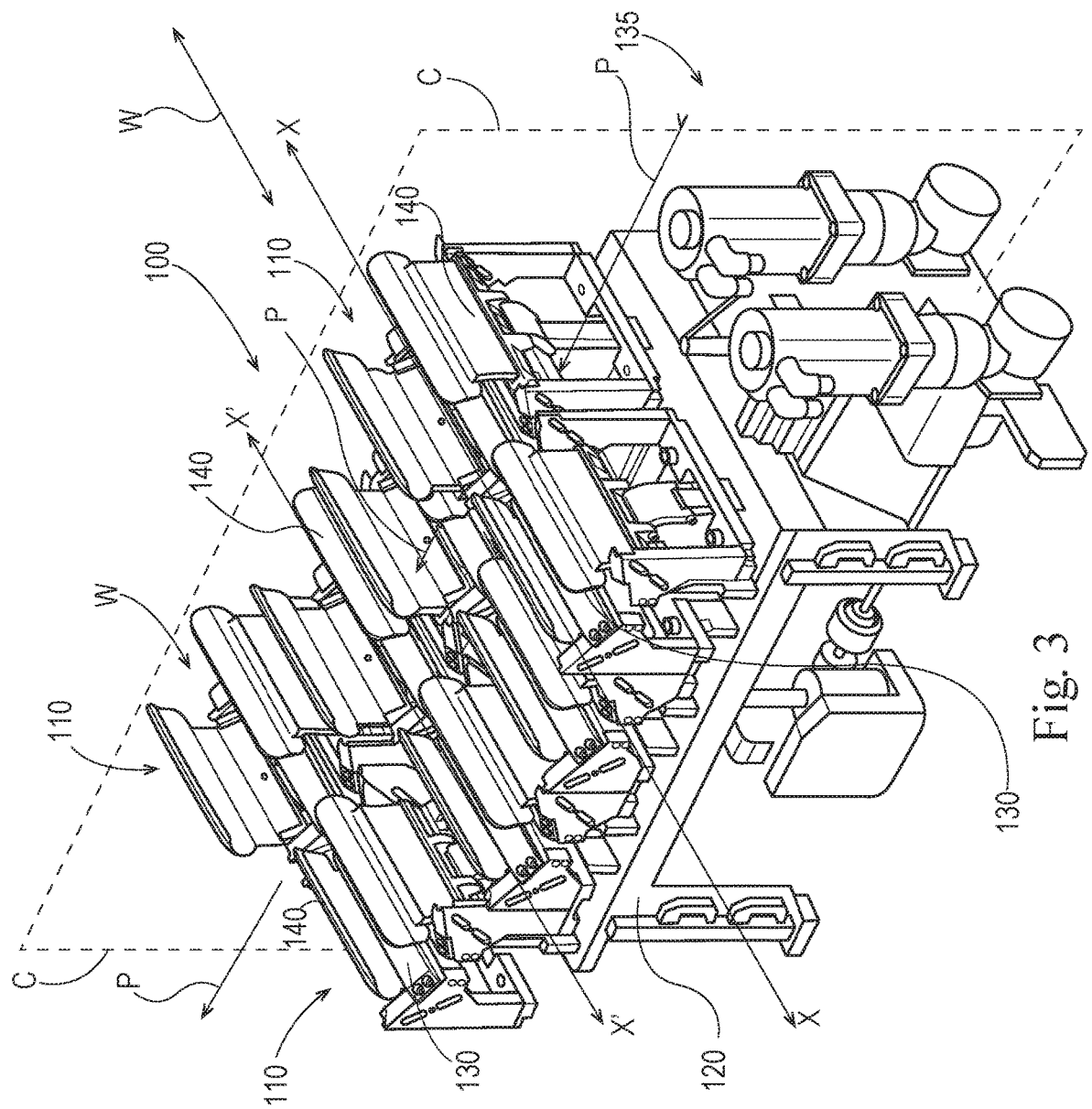
FIG. 3 is a perspective view of an exemplary log saw clamping assembly commensurate in scope with the present disclosure.
Figure 4:
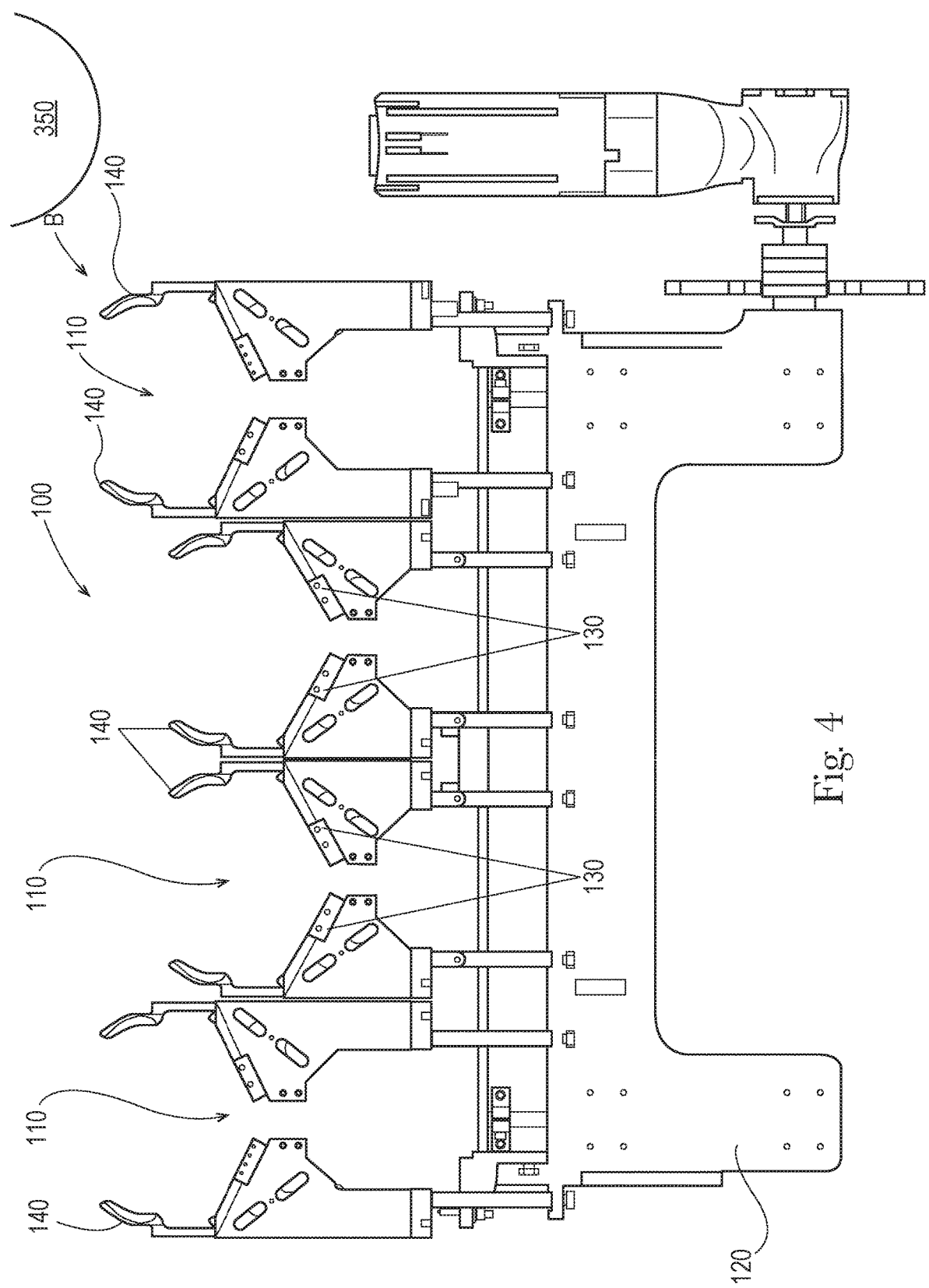
FIG. 4 is a cross-sectional view of a portion of the exemplary log saw clamping assembly of FIG. 3.

As shown in FIGS. 3 and 4, a log saw can be provided with an exemplary log saw clamping assembly 100. Log saw clamping assembly 100 can be provided with a plurality of individual log saw clamps 110 where each individual log saw clamp is provided as a plurality of opposed paddles 140 operably coupled to support structure 120. A region disposed between collectively collinear log saw clamps 110 is provided as a cutting plane C-C for the log saw blade 350 and whose path is indicated by P.

Log saw clamps 110 disposed on either side of path C are capable of acting on convolutely wound log of web material (not shown) advanced in the direction of the arrow W under the action of a motivator (not shown). A motivator (not shown) can be provided by one of skill in the art in the form of pushers or pushing extensions, chain conveyers, belt conveyors, and the like. By way of non-limiting example, a motivator provided as a chain conveyor can be provided as a continuous chain that is capable of acting on the ends of a convolutely wound log of web material (i.e., logs). A circular log saw blade rotates about its own axis and moves about another axis (which may be nearer or farther away) causes the wound log of web material to be cut into a number of small rolls in the cutting plane C-C and along the path P. These cut rolls (e.g., finished product) can then be sent for packaging and distribution.

Adjacent to either side of the cutting plane C-C and path P, the log of web material being processed is retained by log saw clamps 110 each of which bind the wound log of web material and keep the convolutely wound log of web material compressed and positioned with respect to the pushers to ensure precision of the spacing between sequential cuts of each the log of web material to ensure uniformity of the cuts performed on the wound log of web material. It is preferred that each log saw clamp 110 be capable of easy adaption to different diameters of convolutely wound log of web material that are processed from time to time.

Each advancing convolutely wound log of web material can be guided in sliding cradles 130, must therefore pass through the elements forming each log saw clamp 110 both before reaching the cutting plane C-C and after the cutting plane C-C with respect to the movement of each convolutely wound log of web material relative to support structure 120 in the direction of arrow W. Sliding cradles 130 can be a pair of cooperatively engaged and collectively elongate pair of log saw clamps 110. By way of non-limiting example, a log saw may be provided with at least two sliding cradles 130 to process simultaneously and with the same cutting blade two rows of convolutely wound logs of web material advancing in each of corresponding sliding cradle 130 with the aid of a corresponding pusher. If four log saw clamps 110 are provided, each pair of log saw clamps 110 acting on a respective convolutely wound log of web material where one log saw clamp 110 being disposed before cutting plane C-C and one log saw clamp 110 being disposed after cutting plane C-C with the cutting path P disposed therebetween where each log of convolutely wound paper product moves in direction W. It can be preferable that at least one individual log saw clamp 110 be used to clamp logs of convolutely wound paper product to provide support and to prevent the logs from being crushed by the log saw blade. In any regard, each log of convolutely wound paper product is preferably clamped on both sides of the blade to facilitate a straight cut through each log of convolutely wound paper product. Further, it is preferred that each paddle 14 of log saw clamp 110 provide the same force upon the surface of convolutely wound log of web material L. Without desiring to be bound by theory, it is believed that by each paddle 14 of log saw clamp 110 providing the same force upon the surface of convolutely wound log of web material L can prevent the unwanted deformation of convolutely wound log of web material L that can result in bias cutting or product flaws.

As shown in FIGS. 5A-6B, each respective log saw clamp 110 suitable for clamping a convolutely wound log of web material L prior to a saw cut can be formed from a plurality of opposed paddles 140. Each paddle 140 can be provided as a rigid, substantially semicircular hook made of a composite material that provides a rigid structure and reduces friction as the convolutely wound log of web material L moves within log saw clamp 110. One of skill in the art will appreciate that the desired curvature of the inside of a paddle 140 can be derived from modeling products to be processed.

One of skill in the art will appreciate that the radius and curvature of the paddle 140 can be provided in a manner that facilitates and/or provides the cooperative contact of a respective paddle 140 with the surface of a convolutely wound log of web material L having virtually any cross-sectional diameter (e.g., paper towel products can be provided with a cross-sectional diameter ranging from 2.0 inches to 12.0 inches). In the event a product diameter outside this range is required and/or desired, the design of the inter-connection between each respective paddle 140 and any linkages can be simplified (e.g., for example a single bolt attachment) to provide for quick change-out of the paddle 140 for a paddle 140 having an alternative design suitable for the product required.

It was surprisingly found that most "standard" diameters of convolutely wound log of web materials L can utilize a single, standard paddle 170 design. However, a "non-standard" diameter would be facilitated by the ability to quickly change over the standard paddle 170 design to another paddle 170 design. This can be facilitated by operatively connecting each paddle 140 by a linkage, or a series of interconnected linkages, 170 to support structure 120. One of skill in the art will clearly appreciate that an exemplary linkage, or a series of interconnected linkages, 170 can be provided as a two bar linkage. An exemplary two bar linkage can control the distance between each of the opposed paddles 140 that, in operation, are symmetrically disposed about the convolutely wound log of web material L disposed therebetween. One such linkage 170 may comprise a two bar linkage comprising first and second links 170A and 170B.

Disposed upon each linkage 170 operatively and connectively associated with a respective paddle 140 is cam follower 150 or a plurality of cam followers 150. Each cam follower 150 operatively and connectively associated with a respective paddle 140 is operably, connectively, and moveably disposed within a respective cam 160. As used herein, it should be understood by one of skill in the art that a "cam" is to be broadly construed to provide a path or line for travel or motion for sliding or rolling a part or parts. As such, a "cam" may include any device, apparatus, or assembly that prevents the unwanted movement from one portion of a device or assembly to another. Non-limiting examples of various tracks may include a race, a cam, a trace, a channel, a groove, a rail, or the like all of which are used interchangeably, and combinably, herein without limitation.

As indicated, each cam follower 150 operatively and connectively associated with a respective paddle 140 can be slidingly fitted within a respective cam 160. Each respective cam 160 can be machined or formed in a supporting surface 180. Each respective cam 160 can be inclined at a desired, predetermined angle relative to vertical axis A to provide the requisite operable, connective, and moveable disposition of any cam followers 150 disposed within the respective cam 160. It should be noted that vertical axis A can also be referred to herein as axis of symmetry A because axis of symmetry A (i.e., vertical axis A) divides log saw clamp 110 into two congruent halves. In other words, one cam, one cam follower, one linkage, and one paddle forming one side of log saw clamp 110 are disposed upon one side of the vertical axis A (axis of symmetry A) and an opposing cam, cam follower, linkage, and paddle forming the second side of log saw clamp 110 are oppposingly disposed about the vertical axis A (axis of symmetry A).

In one embodiment, each linkage 170 operably connected to paddles 140 forming a pair of opposing paddles 140 for clamping a convolutely wound log of web material L prior to a saw cut is connected to a common mechanism that facilitates rectilinear motion of each linkage 170 and the associated paddle 140. The common mechanism can then be translated from a first position where each linkage 170 operably connected to a respective paddle 140 causes the respective paddle 140 to refrain from contacting engagement with the convolutely wound log of web material L disposed between opposing paddles 140 to a second position where each linkage 170 operably connected to a respective paddle 140 causes the respective paddle 140 to contactingly engage the surface of convolutely wound log of web material L disposed between opposing paddles 140. Naturally, one of skill in the art will understand that the first and second positions can be used interchangeably. For example, one of skill in the art will understand that the first position can provide opposing paddles 140 in contacting engagement with the surface of convolutely wound log of web material L disposed therebetween and the second position can provide opposing paddles 140 in non-contacting engagement with the surface of convolutely wound log of web material L disposed therebetween.

By way of non-limiting examples, a translational movement of the respective linkages 170 and each paddle 140 cooperatively associated thereto from a first position to a second position therein can be provided by a suitable actuator such as a cam/cam follower system, mechanical actuators, hydraulic actuators, pneumatic actuators, piezo-electric actuators, electro-mechanical actuators, linear motors, telescoping linear actuator, combinations thereof, and the like. In any regard, the chosen actuator should favorably act upon the respective linkages 170 to provide a substantially rectilinear motion in the direction V relative to axis A.

As shown in FIGS. 5A-6B, the application of force by an actuator to a respective linkage 170 causes linkage 170 to apply a force to the cam follower 150 cooperatively engaged thereto. Alternatively, the force by an actuator can be applied to a bracket 181 that is operatively and connectively engaged to at least a pair of respective linkages 170. In this manner, the application of force to a bracket 181 that is connectively engaged to a pair of linkages (or any number of linkages) can provide for the substantially similar rectilinear motion in the direction V relative to axis A of each linkage 170 engaged thereto.

As the force exerted by a respective linkage 170 to the cam follower 150 cooperatively engaged thereto increases, cam follower 150 is caused to translate within cam 160 disposed thereabout. It can be preferred that the facilitation of a so-called "quick change-over" of paddles 140 can be facilitated by providing limited connection points (e.g., a single connection point) between the portion of the linkage 170 engaged proximate to cam 160 and the respective paddle 140. For example if a converting process experiences difficulty processing a highly compressible product, an end user of log saw clamp 110 can easily and quickly install a specific paddle 170 design that is capable of support these particular product.

By way of non-limiting example, a linkage 170 provided as a two bar linkage can be operably connected to a right-handed paddle 140 and a linkage 170 provided as a two bar linkage is operably connected to a left-handed paddle 140. The cam follower 150 of each of the right-handed paddle 140 and associated linkage 170 and the left-handed paddle 140 and associated linkage 170 are constrained to ride in a respective cam 160 that is provided with sufficient length to provide for any diameter of convolutely wound log of web material L desired. It was surprisingly found that the use of cam 160/cam follower 150 systems significantly reduced, or even eliminated drag or binding as the linkage 170 moves up or down relative to the convolutely wound log of web material L disposed within sliding cradle 130 of log saw clamp 110.

The log saw clamp 110 of the present disclosure leverages a fixed platform that is level with any in-feed and discharge sliding conveyors 130. This aspect of the log saw clamp 110 can readily accommodate any diameter changes of the convolutely wound logs of web material L to be processed. In short, this can be accomplished by using a 2-bar linkage 170 that is trapped in a slot (i.e., cam 160/cam follower 150 system described herein). As a force is applied to the linkage 170, the distance between opposed paddles 140 increases or decreases because of the angle provided to cam 160 relative to the vertical axis A. The relative distance between opposed paddles 140 can be facilitated due to the angle relative to the vertical axis A of the cam 160 and the application of force to linkage 170 toward or away from convolutely wound log of web material L.

This is a clear advantage of the presently described log saw clamp 110 and log saw clamping assembly 100 over the known designs. For example, current log saw clamps may provide individual actuation systems for each clamp forming an opposed pair of clamps. Additional current log saw clamps provide a belt to tighten down on the clamps and adjust for product diameter by using wedges. The presently described log saw clamp 110 and log saw clamping assembly 100 advantageously adjusts both paddles forming the opposed paddles 140 simultaneously. The presently described log saw clamp 110 and log saw clamping assembly 100 advantageously keeps any in-feed and discharge sliding conveyors 130 stationary and adjusts the linkages 170 relative to the diameter of the convolutely wound log of web material L.

As cam follower 150 translates within cam 160, the paddle 140 cooperatively associated thereto is caused to only rotate in the direction R about a central axis located proximate to the centroid of the of cam follower 150. In other words, the proximal end portion of the paddle 140 connectively engaged to linkage 170 is preferably limited to rotational movement about the axis of engagement between paddle 140 and linkage 170. It is believed that limiting this paddle 140 to purely rotational movement relative to linkage 170 can eliminate any elevation change occurring when the distance between opposed paddles 140 expands or contracts.

As the paddle 140 rotates in the direction R about the central axis of cam follower 150, the paddle can be directed into contacting engagement, or alternatively disengaged from contacting engagement, with the surface of convolutely wound log of web material L as indicated by the arrows disposed at the distal end of each paddle 140.

Figure 5A:
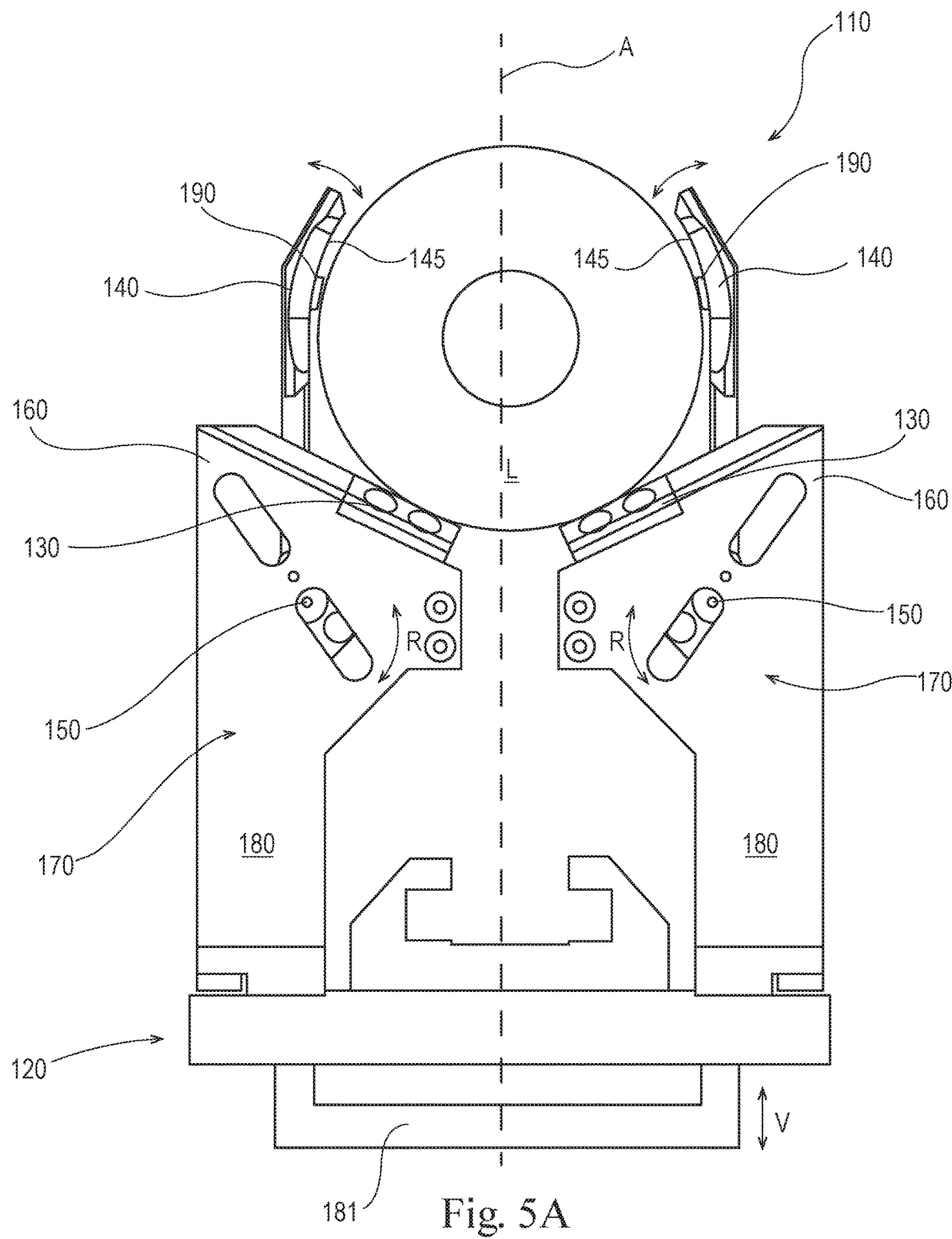
FIG. 5A is a cross-sectional view of an exemplary log saw clamp suitable for clamping a log of convolutely wound web material to be cut by a log saw showing the opposed paddles disposed away from contacting engagement with a log to facilitate movement of the log relative to the log saw clamp.
Figure 5B:
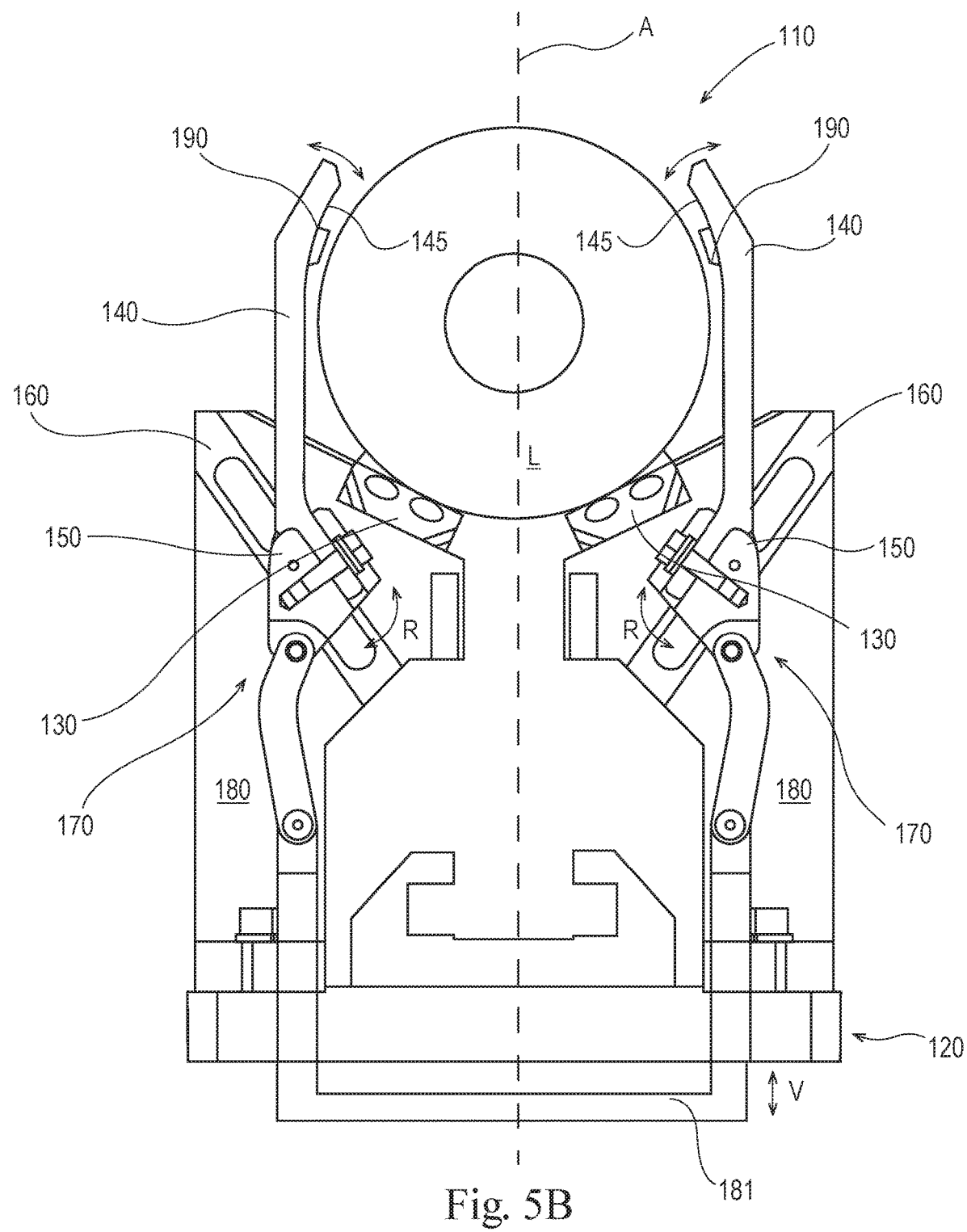
FIG. 5B is a cross-sectional view of the reverse side of the exemplary log saw clamp of FIG. 5A.
Figure 6A:
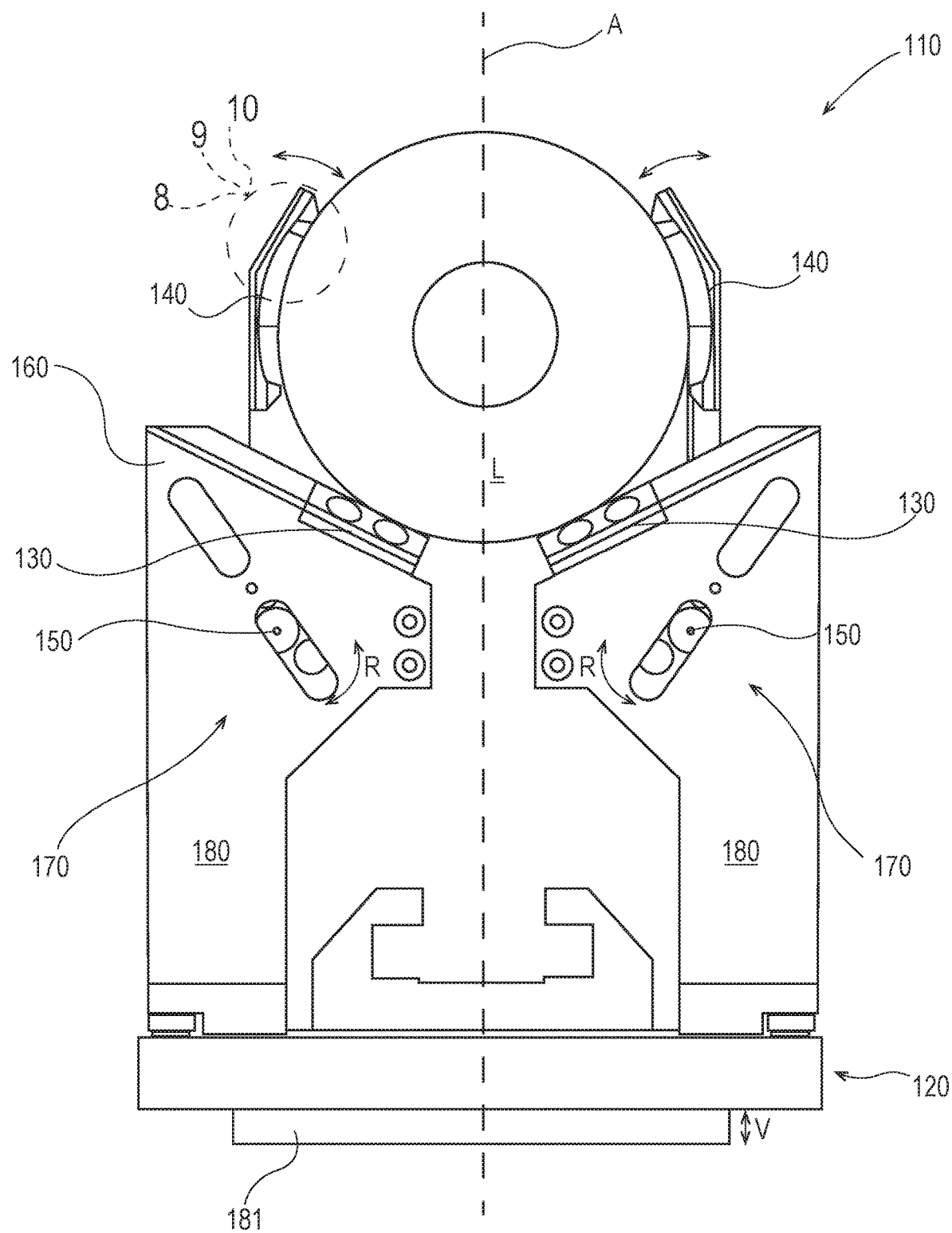
FIG. 6A is a cross-sectional view of an exemplary log saw clamp suitable for clamping a log of convolutely wound web material to be cut by a log saw showing the opposed paddles disposed in contacting engagement with a log to prevent movement of the log relative to the log saw clamp.
Figure 6B:
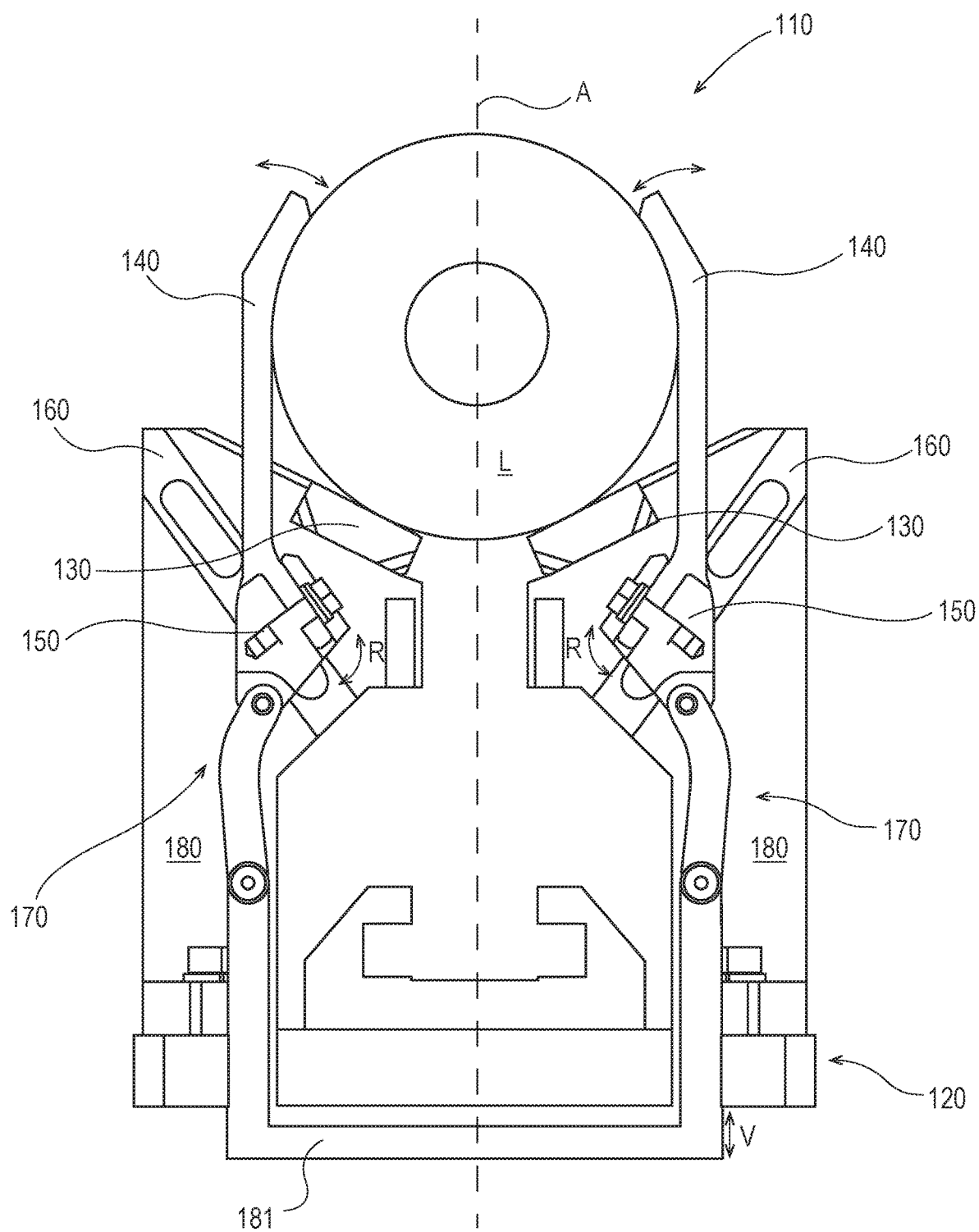
FIG. 6B is a cross-sectional view of the reverse side of the exemplary log saw clamp of FIG. 6A.

In other words, a force exerted upon linkage 170 by an actuator that is parallel to axis A and is directed toward convolutely wound log of web material L will cause linkage 170 to exert a pushing force upon cam follower 150 operatively connected thereto in a direction oriented toward convolutely wound log of web material L. This upwardly-oriented force exerted upon cam follower 150 by linkage 170, in turn, causes cam follower 150 to translate upward and away from convolutely wound log of web material L while disposed within cam 160. The upward movement of cam follower 150 within cam 160 causes each paddle 140 to rotate about cam follower 150 in a direction that directs the distal end of paddle 140 toward convolutely wound log of web material L. Therefore, providing an upward force upon the linkage 170 cooperatively associated with each of a pair of opposed paddles 140 as shown in FIGS. 5A-5B can result in the retentive binding of the convolutely wound log of web material L between the pair of opposed paddles 140 so that the convolutely wound log of web material L is compressed and positioned with respect to the log saw pushers to ensure the precision of the spacing between sequential cuts in the convolutely wound log of web material L in such a way as to ensure uniformity of the cuts performed on the convolutely wound log of web material L as shown in FIGS. 6A-6B. Conversely, a force exerted upon linkage 170 by an actuator that is parallel to axis A and is directed away from convolutely wound log of web material L will cause linkage 170 to exert a pulling force upon cam follower 150 operatively connected thereto in a direction oriented away from convolutely wound log of web material L. This downwardly-oriented force exerted upon cam follower 150 by linkage 170, in turn, causes cam follower 150 to translate downward and toward convolutely wound log of web material L while disposed within cam 160. The downward movement of cam follower 150 within cam 160 causes each paddle 140 to rotate about cam follower 150 in a direction that directs the distal end of paddle 140 away convolutely wound log of web material L. Therefore, providing a downward force upon the linkage 170 cooperatively associated with each of a pair of opposed paddles 140 as shown in FIGS. 6A-6B can result in the release of the convolutely wound log of web material L from contacting engagement from between the pair of opposed paddles 140 so that the convolutely wound log of web material L is released and allowed to move within space disposed between opposed paddles 140 as shown in FIGS. 5A-5B.

In one embodiment, each of cam 150 and cam follower 160 are disposed in a mirror-like relationship relative to the vertical axis A and the convolutely wound log of web material L to be acted upon by the log saw cooperatively associated with log saw clamping assembly 100. Additionally, one of skill in the art will recognize that cam follower 160 could be provided as a plurality of small rollers suitable to provide essentially sliding movement within cam 150.

One of skill in the art would be able to provide the cam follower 160 with an inclination angle of 30° to 65° relative to the vertical axis A in order to combine, in a way which is deemed to be optimal, the vertical and horizontal components of the displacement of each paddle 140, and to allow the log saw clamping assembly 100 to work as best as possible whatever the diameter of convolutely wound log of web material L. Thus, it is believed that the log saw clamping assembly 100 can be extremely versatile by having the capability to handle a convolutely wound log of web material L having virtually any diameter.

When a saw blade associated with a log saw cooperatively associated with the herein described log saw clamping assembly 100 is inoperative and displaced away from a cutting relationship with a convolutely wound log of web material L, the pair of opposed paddles 140 are not associated, or in contacting engagement, with the convolutely wound log of web material L. Because the pair of opposed paddles 140 are not in contacting engagement with the convolutely wound log of web material L, the convolutely wound log of web material L may translate forwards in the direction W while engaged within sliding cradle 130. Sliding cradle 130 is capable of translating the convolutely wound log of web material L from a position external to the log saw clamping assembly 100 to a second position relative to, and intermediate, the pair of opposed first and second paddles 140. Sliding cradle 130 is also capable of translating the convolutely wound log of web material L from a position relative to, and intermediate, the pair of opposed first and second paddles 140 to a position external to the log saw clamping assembly 100 after the log saw has processed the convolutely wound log of web material L.

When the forwardly translating convolutely wound log of web material L is in a desired position for the log saw to transversely cut convolutely wound log of web material L, the paddles 140 are positioned in contacting and compressive engagement with the surface of convolutely wound log of web material L as described supra. At this position, the convolutely wound log of web material L is unable to move relative to the log saw clamping assembly 100.

Each paddle 140, being approximately semicircular and in mirror-like relationship, embrace the convolutely wound log of web material L laterally and on top as well, thereby retaining the convolutely wound log of web material L in a preset position. At the bottom, each convolutely wound log of web material L rests upon sliding cradle 130. The log saw can then be energized and transversely cut the convolutely wound log of web material L as described supra.

Figure 8:
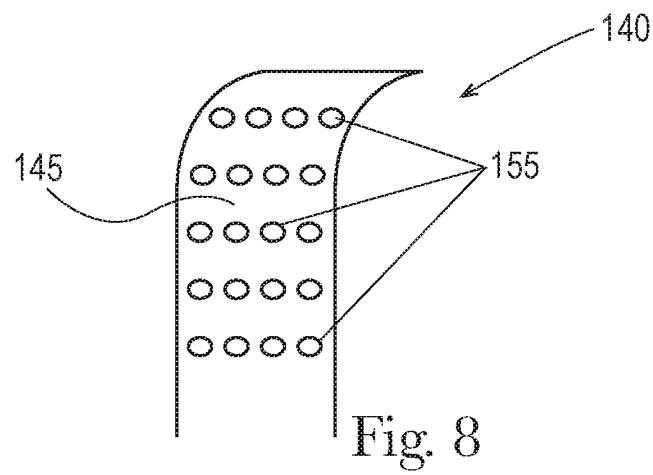
FIG. 8 is a plan view of an exemplary paddle provided with an exemplary texture upon a surface thereof.
Figure 9:
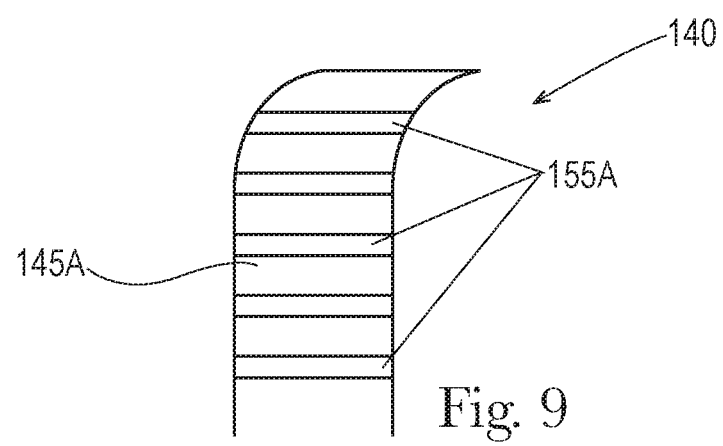
FIG. 9 is a plan view of an exemplary paddle provided with another exemplary texture upon a surface thereof.

As shown in FIGS. 8-9, an exemplary paddle 140 can be provided with a surface 145,145A that has a texture provided thereto. Without desiring to be bound by theory, it is believed that providing a paddle 140 with a finish texture upon surface 145, 145A that can reduce the slippage of a convolutely wound log of web material L disposed between opposed paddles 140.

By way of non-limiting example, as shown in FIG. 8, an exemplary paddle 140 can be provided with a surface 145 having a finish texture that comprises a plurality of protuberances 155. Each protuberance of the plurality of protuberances 155 can be arranged in any manner desired upon the surface 145 of a paddle 140 required by the user in order to reduce the slippage of a convolutely wound log of web material L disposed between opposed paddles 140. For example, each protuberance of the plurality of protuberances 155 can be randomly distributed upon the surface 145 of a paddle 140. Alternatively, each protuberance of the plurality of protuberances 155 can be provided in defined patterns (as may be required by the web material forming convolutely wound log of web material L or by any other process parameter) that form the finish texture upon the surface 145 of paddle 140. For example, a finish texture can be provided so that a series of protuberances of the plurality of protuberances 155 are collectively elongate upon the surface 145 of paddle 140. It is also believed that the presence of a finish texture upon the surface 145 of each paddle 140 can also provide a function of guidance for the transmission of a convolutely wound log of web material L in the region disposed between a pair of opposed paddles 140. It was found that convolutely wound log of web material L can bind against a log saw clamp when moving into the region disposed between the opposed portions of the log saw clamp 110. This is believed to happen when the cut end of the convolutely wound log of web material L needs to progress through a series of clamps forming the log saw clamping assembly 100. If the cut end of the convolutely wound log of web material L is not coaxially aligned with horizontal axis H, the recently cut end of convolutely wound log of web material L can engage a portion of the log saw clamp 110 in a manner that effectively prevents translation of the convolutely wound log of web material L into the region disposed between opposed paddles 140.

Further, each protuberance of the plurality of protuberances 155 can have any geometry that may be required to reduce the slippage between a convolutely wound log of web material L and the surface 145 of paddle 140. For example, each protuberance of the plurality of protuberances 155 can be provided as a pin extending from the surface 145 of paddle 140. Alternatively, each protuberance of the plurality of protuberances 155 can be provided as a polyhedron having a shape that is a pyramid, a cylinder, a cone, a truncated cone, a sphere, a prism, an ellipsoid, and/or combinations thereof. Clearly, one of skill in the art will recognize that the plurality of protuberances 155 can be provided as combinations thereof.

FIG. 9 depicts another non-limiting example of a paddle 140 provided with a surface 145A having a finish texture that comprises a series of linear sections 155A. The series of linear sections 155A can be disposed upon and extend from the surface 145A of paddle 140. Alternatively, the series of linear sections 155A can be disposed upon and extend into the surface 145A of paddle 140. Each series of linear sections 155A can be disposed at any location upon the surface 145A of paddle 140. Further any number of series of linear sections 155A can be disposed at any location and/or orientation upon the surface 145A of paddle 140. Additionally, linear section of a series of linear sections 155A can be provided with any length, height, and/or depth relative to the surface 145A of paddle 140. The elongate grooves and/or protuberances forming the respective plurality of protuberances 155/series of linear sections 155A can be linear, curvilinear, sinusoidal, and/or combinations thereof. The elongate grooves and/or protuberances can be used together to form a surface 145, 145A that has both protuberances extending from the surface 145, 145A of paddle 140 and grooves extending into the surface 145, 145A of paddle 140.

Figure 10:
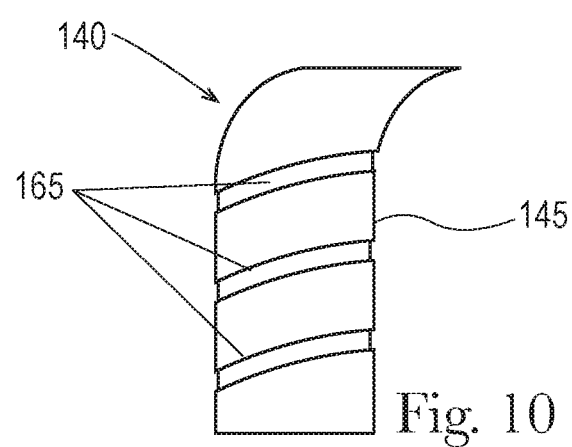
FIG. 10 is a cross-sectional view of an exemplary paddle provided with exemplary channels disposed therein.

As shown in FIG. 10, paddle 140 can be provided with at least one respective channel 165 disposed therethrough for the fluid communication of a source of glue or other fluid from a position external to paddle 140 to the surface 145 of paddle 140. The glue or other fluid can be supplied to the surface 145 of paddle 140 via a respective channel 165 disposed within paddle 140 so that a glue or other fluid that is desired to be applied to the surface of a convolutely wound log of web material L can be supplied from a glue or fluid source disposed external to paddle 140 and provided in fluid communication via channel 165 as discussed infra.

Sliding cradle 130 can manifest itself as a belt, a plurality of belts, rollers, low-friction/smooth surfaces, combinations thereof, and the like. In any regard, it is provided that the objective of sliding cradle 130 is to provide a surface having low surface energy to facilitate the translational movement of a convolutely wound log of web material L into, through, and out of the region disposed between a pair of opposing paddles 140. By way of example, one of skill in the art can could provide motivation to the translational movement of a convolutely wound log of web material L by providing a motive force to a belt or each of a plurality of belts disposed within sliding cradle 130. Alternatively, one of skill in the art could provide for the translational movement of a convolutely wound log of web material L within sliding cradle 130 by providing a push rod that cooperatively engages the end of convolutely wound log of web material L distal from the log saw blade to push the convolutely wound log of web material L over and through a sliding cradle 130 formed from rollers or a low friction/smooth surface.

Referring again to FIGS. 3-4, a plurality of log saw clamps 110 can be provided in an array to form log saw clamping assembly 100. By way of example, a pair of log saw clamps 110 can be provided in a collectively elongate relationship along horizontal axis X. A pair of log saw clamps 110 provided in a collectively elongate relationship can facilitate the contacting engagement of a convolutely wound log of web material L within the respective sliding cradle 130 of each log saw clamp 110. In such an arrangement, a first log saw clamp 110 can contactingly engage a first portion of a convolutely wound log of web material L disposed within its respective sliding cradle 130, a second log saw clamp 110 can contactingly engage a second portion of the convolutely wound log of web material L disposed within its respective sliding cradle 130, and log saw blade 350 can be disposed intermediate the respective first and second log saw clamps 110.

A controller 135 can provide control of the positional placement of first log saw clamp 110 of log saw clamping assembly 100 to contactingly engage a first portion of a convolutely wound log of web material L disposed within its respective sliding cradle 130, second log saw clamp 110 of log saw clamping assembly 100 to contactingly engage a second portion of the convolutely wound log of web material L disposed within its respective sliding cradle 130, and log saw blade 350 can be disposed intermediate the respective first and second log saw clamps 110. The controller 135 can include any suitable structure for controlling the operation of at least part of the log saw clamps 110 of log saw clamping assembly 100, such as a computing device.

A network can be coupled to the controller 135 and various components of the log saw clamping assembly 100 (such as actuators). The network can facilitate communication between components of the log saw clamping assembly 100. The network can represent any suitable network or combination of networks facilitating communication between components in the system. The network could, for example, represent a wired or wireless Ethernet network, an electrical signal network (such as a HART or FOUNDATION FIELDBUS network) a pneumatic control signal network, or any other or additional network(s).

In use, a convolutely wound log of web material L can approach the collectively elongate arranged first and second log saw clamps 110 in an orientation where the longitudinal axis of the convolutely wound log of web material L is parallel to horizontal axis X. Convolutely wound log of web material L enters each sliding cradle 130 of each respective first and second log saw clamps 110 sequentially. Upon the final positioning of the convolutely wound log of web material L within each sliding cradle 130 associated with each respective first and second log saw clamps 110, the pair of opposed paddles 140 of each log saw clamp 110 can then contactingly engage the surface of the convolutely wound log of web material L. Once convolutely wound log of web material L is secured as required between each pair of opposed paddles 140 of each respective first and second log saw clamps 110, log saw blade 350 can then translate in the direction B between the first and second log saw clamps 110 and effectively cut convolutely wound log of web material L between the first and second log saw clamps 110.

In a first embodiment, it will be appreciated that each log saw clamp 110 in log saw clamping assembly 100 can be provided with the ability to provide a different contact pressure via the respective paddles 140 to the surface of convolutely wound logs of web material L. By way of non-limiting example, a first pair of opposed paddles 140 of a first log saw clamp 110 can apply a first contact pressure to the surface of a respective convolutely wound log of web material L cooperative with horizontal axis X and a second pair of opposed paddles 140 of a second log saw clamp 110 can apply a second contact pressure to the surface of a respective convolutely wound log of web material L cooperative with horizontal axis X'. By way of another non-limiting example, a first pair of opposed paddles 140 of a collectively linear pair of log saw clamps 110 can apply a first contact pressure to the surface of a convolutely wound log of web material L and the second pair of opposed paddles 140 of the collectively linear pair of log saw clamps 110 can apply a second contact pressure to the surface of the convolutely wound log of web material L.

The pressure disposed by a respective paddle 140 can be determined by the placement of a measurement device 190 upon the surface 145 of paddle 140. Measurement device 190 could be provided as a pressure sensor such as a load cell. Measurement device 190 can be operatively connected to a control system or other feedback system used by those of skill in the art to determine the pressure exerted by paddle 140 upon the surface of a convolutely wound log of web material L. For example, a pressure set-point can be input into a control system, the pressure exerted by paddle 140 upon the surface of a convolutely wound log of web material L can be measured, and the pressure exerted by paddle 140 upon the surface of a convolutely wound log of web material L can be adjusted as required according to a feed-back loop. Thus, if a paddle 140 or pair of opposed paddles 140 is applying excessive pressure upon the surface of a convolutely wound log of web material L causing the convolutely wound log of web material L to deform, the measurement device 190 can measure the pressure, the measured pressure is then compared to a known or desired set-point, an error is calculated based upon the measured and set-point values, the error is then used to adjust the actual pressure applied to the convolutely wound log of web material L by a respective paddle 140 or pair of opposed paddles 140. Knowing the actual pressure applied by a respective paddle 140 or pair of opposed paddles 140 to the surface of a convolutely wound log of web material L disposed therebetween can effectively increase the reliability of the log saw process in providing a more consistent (i.e., more consistent cuts) transverse cut upon a convolutely wound log of web material L. This can provide each finished product resulting from the cuts performed upon a convolutely wound log of web material L by a log saw with a more consistent and/or uniform overall length.

As discussed supra, each collectively linear pair of log saw clamps 110 can be independently adjusted to facilitate the processing of convolutely wound logs of web material L having different diameters or physical characteristics. For example, a first pair of opposed paddles 140 of a first log saw clamp 110 can be spaced to accommodate a respective convolutely wound log of web material L cooperative with horizontal axis H and has a first diameter and a second pair of opposed paddles 140 of a second log saw clamp 110 can accommodate a respective convolutely wound log of web material L that is cooperative with horizontal axis X' and has a second diameter. By way of another non-limiting example, a first pair of opposed paddles 140 of a first log saw clamp 110 can be spaced to apply a first pressure to the surface of a respective convolutely wound log of web material L cooperative with horizontal axis H and having a first diameter. A second pair of opposed paddles 140 of a second log saw clamp 110 can be spaced to apply a second pressure to the surface of a respective convolutely wound log of web material L that is cooperative with horizontal axis X' and having a second diameter. In all respects, the first and second diameters can be the same or different and the first and second pressures applied to the surface of a convolutely wound log of web material L can be the same or different.

Still referring to FIGS. 3-4, one of skill in the art could effectively engage a convolutely wound log of web material L with only one log saw clamp. However, it is believed that the most beneficial use of a suitable log saw clamping assembly 100 will provide for the use of at least a pair of co-linearly disposed, collectively elongate arranged log saw clamps 110 both disposed in opposed relationship to the path B of log saw blade 350 disposed intermediate and traversing in a path transverse thereto to transversely cut a convolutely wound log of web material L disposed in contacting engagement therewith.

Figure 7:
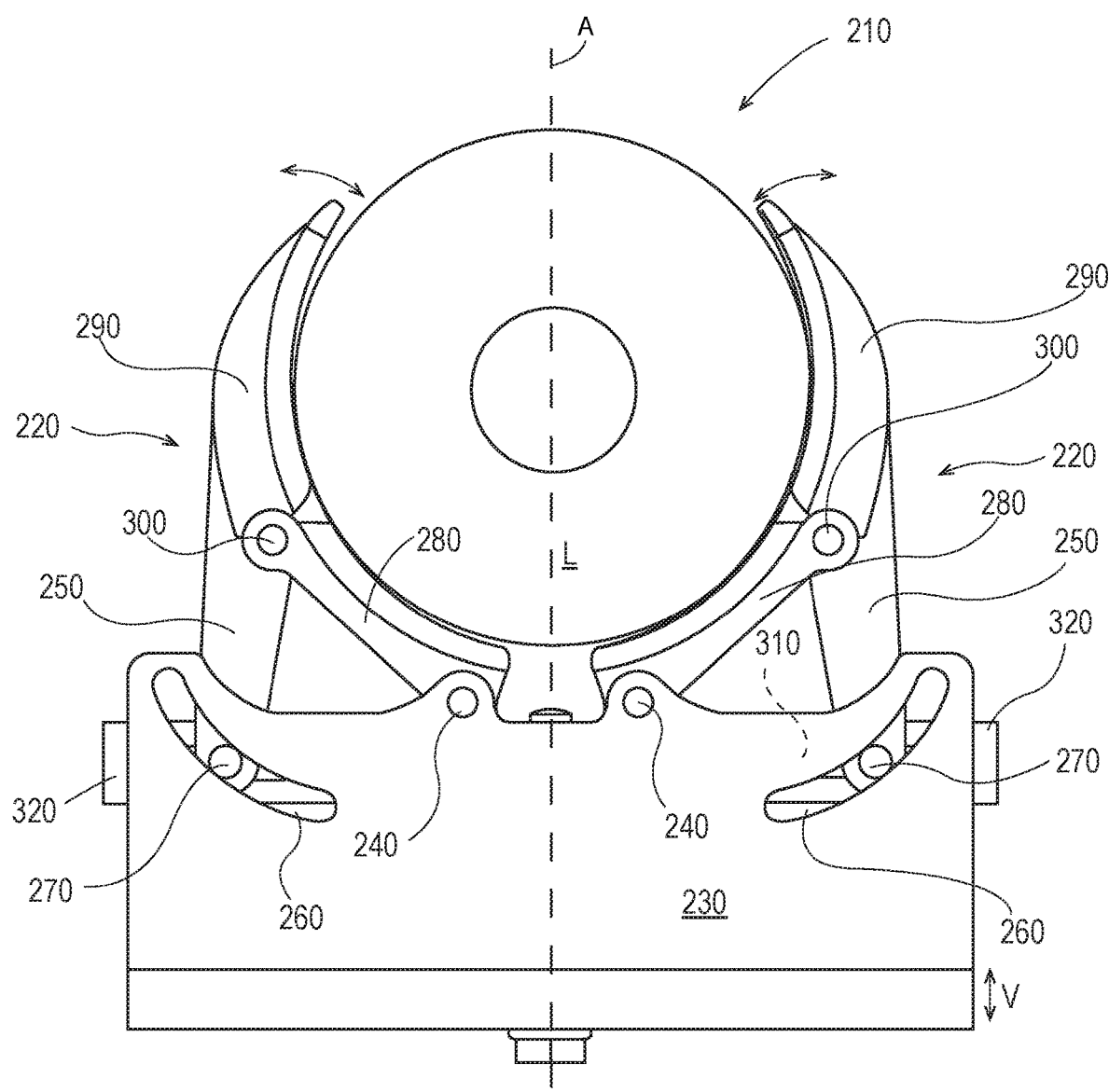
FIG. 7 is a cross-sectional view of an alternative exemplary log saw clamp suitable for clamping a log of convolutely wound web material to be cut by a log saw showing a pair of opposed complex levers disposed in contacting engagement with a log to prevent movement of the log relative to the log saw clamp.

A log saw clamping assembly 100 utilizing alternative log saw clamp 210 can be provided by one of skill in the art according to the embodiments shown in FIG. 7. In this embodiment, a convolutely wound log of web material L is supported by log saw clamp 210 can be effectively restrained between a pair of opposed complex levers 220. Each complex lever 220 is fixably attached to a frame member 230 at a pivot 240. In this way, a proximal end of complex lever 220 can rotate about the axis formed by the conjoining of frame member 230 to the proximal end of complex lever 220 at pivot 240.

A connecting linkage 250 is operably connected to the distal end of complex lever 220 at a first end and connectively engaged to a cam 260 disposed within frame member 230 via cam follower 270. Complex lever 220 is preferably formed by two connectively engaged lever members 280, 290. The connectively engaged lever members 280, 290 are matingly and rotatably engaged to each other at secondary pivot 300. Further, cam follower 270 operably connected to connecting linkage 250 is also operably connected to secondary cam 310 disposed within secondary frame member 320. Secondary cam 310 is positioned in a fixed relationship relative to the region disposed between the pair of opposed complex levers 220. Thus, cam follower 270 is constrained in movement by both secondary cam 310 and cam 260.

In operation, after a convolutely wound log of web material L is presented in the region disposed between the pair of opposed complex levers 220, frame member 230 is translated toward convolutely wound log of web material L in direction V that is substantially parallel to axis A. The upward motion of frame member 230 causes cam 260 to translate toward convolutely wound log of web material L. The upward translation of cam 260 causes cam follower 270 to positionally translate toward axis A within cam 260. Further, since cam follower is also operably associated with secondary cam 310, cam follower 270 is restricted to motion in a direction that is orthogonal to axis A. In other words, cam follower 270 can only translate toward and away from axis A while disposed in secondary cam 310 as cam 260 respectively translates toward or away from convolutely wound log of web material L in a direction that is substantially parallel to axis A.

Since cam follower 270 and connecting linkage 250 are operably connected to connectively engaged lever members 280, 290 forming complex lever 220, the motion of cam follower 270 orthogonal to axis A causes complex lever 220 to rotate about pivot 240 either toward, or away from, convolutely wound log of web material L in the direction of the arrows shown at the distal end of each complex lever 220 as cam follower 270 respectively translates toward, or away from, convolutely wound log of web material L. The rotational connection between connectively engaged lever members 280, 290 about secondary pivot 300 as complex lever 220 rotates about pivot 240 causes the lower lever member 280 to first contact the surface of convolutely wound log of web material L as cam follower 270 translates toward convolutely wound log of web material L. Upon the contacting engagement of lower lever member 280 with the surface of convolutely wound log of web material L, upper lever member 290 than rotates about secondary pivot 300 to subsequently contact convolutely wound log of web material L. After engagement with the surface of convolutely wound log of web material L by both lever members 280, 290, the convolutely wound log of web material L can then subsequently cult by the saw blade of the log saw.

Next, as convolutely wound log of web material L disposed in the region between the pair of opposed complex levers 220 has been processed as required, frame member 230 is translated away from convolutely wound log of web material L in a direction V that is substantially parallel to axis A. The downward motion of frame member 230 causes cam follower 270 to directionally translate away from convolutely wound log of web material L as it positionally translates within cam 260. However, since cam follower 270 is restricted to motion orthogonal to axis A due to the influence of secondary cam 310, the outward motion of cam follower 270 in a direction orthogonal to axis A causes complex lever 220 to rotate about pivot 240 away from convolutely wound log of web material L in the direction of the arrows shown at the distal end of each complex lever 220.

The rotational connection between connectively engaged lever members 280, 290 about secondary pivot 300 as complex lever 220 rotates about pivot 240 as cam follower 270 translates away from convolutely wound log of web material L causes upper lever member 290 to first disengage from contact with the surface of convolutely wound log of web material L. Upon the disengagement of upper lever member 290 from the surface of convolutely wound log of web material L, lower lever member 280 than rotates about pivot 240 to subsequently disengage from contact with convolutely wound log of web material L.

Figure 11:
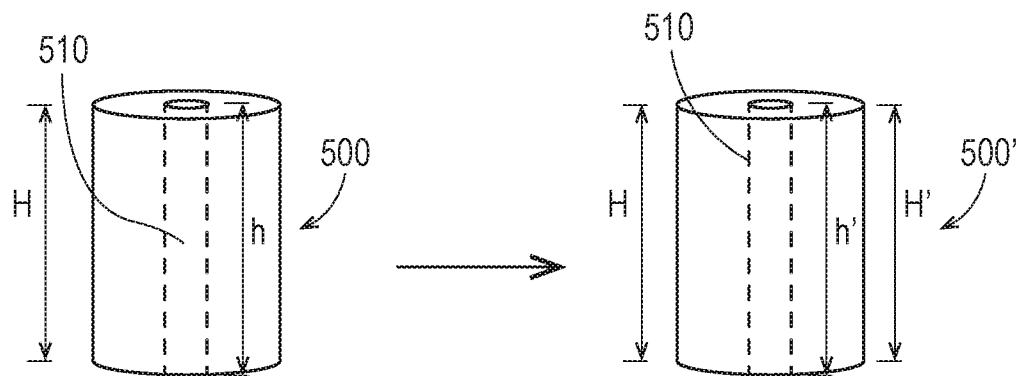
FIG. 11 is a plan view of an idealized finished product have an overall idealized height and an idealized core length (e.g., meets target lengths) and an off-quality finished product having an idealized height (e.g., meets target length) and a core length that is different from the desired target length (e.g., does not meet target length)

FIG. 11 shows an idealized finished product 500 resulting from the processing of an exemplary convolutely wound log of web material L by a log saw. As shown, the idealized finished product 500 will have a target height, H, and a core 510 having a target height, h, that is set by the manufacturer according to a desired need. For example, the manufacturer may desire to have all finished products 500 to each have the target height H and a core 510 having a target height h in order to facilitate any subsequent packaging equipment to operate in a more efficient manner, or minimize amount of material used to package the finished product 500, or even to provide a consumer accepted and more appealing finished product 500.

However, due to the use of current log saw clamping technologies currently available for use by manufactures of log saws, finished products are seldom produced in a manner that provides an idealized finished product. Typical finished products 500' may have a resulting end that is tapered due to a biased transverse cut of the convolutely wound log of web material L. By way of example only, the finished product 500' may have one portion with a height, H and another portion of the finished product with a different height, H'. Further finished product 500' may have a core having a height h' that is different than the desired target height h.

Additionally, it has been observed that current log saw clamping technologies currently available for use by manufactures of log saws can result in the wide variation of finished product 500 target heights H and core lengths h from multiple convolutely wound logs of web material L processed concurrently as well as the wide variations observed during the processing of the same convolutely wound log of web material L. This variation can be caused by a plurality of conditions that each alone can contribute to the observed variations in the finished products 500.

By way of example, the material(s) used to form convolutely wound log of web material L can result in convolutely wound log of web material L with a high degree of compressibility. When the log saw clamp endeavors to appropriately clamp a convolutely wound log of web material L having a high degree of compressibility, the convolutely wound log of web material L compresses (e.g., squishes) in the region proximate to the log saw clamps. Even though the log saw blade may be performing a transverse cut upon the convolutely wound log of web material L, when the convolutely wound log of web material L is released from the clamps, the material forming the convolutely wound log of web material L may have differing degrees of displacement.

By way of another example, economics requires the use of high-speed manufacturing processes. The ability of current log saw equipment, the associated log saw clamping assemblies, as well as current machine control strategies and architectures and can introduce higher degrees of uncertainty of the placement of convolutely wound logs of web material L relative to the various components associated with the log saw. In other words, log saw have a significant number of moving parts and are attempting to perform a function on a material that is moving relative to the log saw itself. Due to all of the potential uncertainties in the process, providing a log saw clamp that reduces the degrees of freedom associated with the log saw is truly remarkable.

Figure 12:
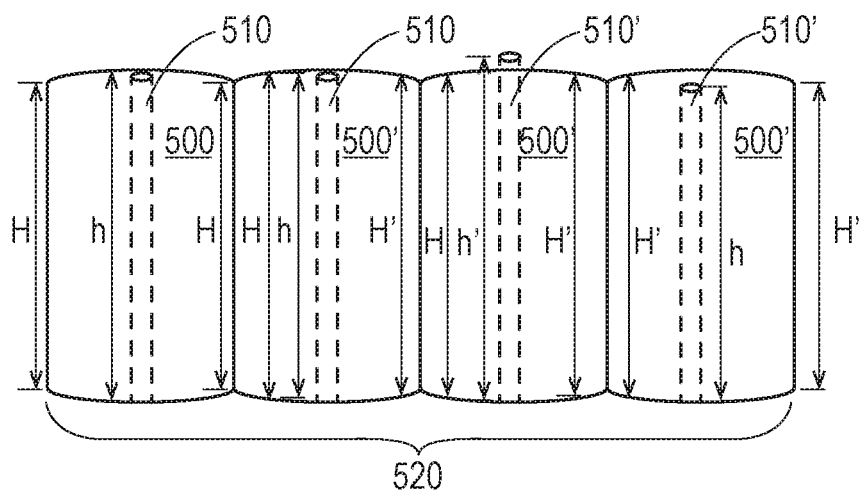
FIG. 12 is a plan view of an exemplary multi-count package containing a plurality of finished products each having height and core lengths that may meet target length or do not meet target lengths but each finished product resulting from a biased transverse cut by a typical prior art log saw having an exemplary prior art log saw clamping assembly; and, FIG. 13 is a plan view of a typical finished product resulting from a biased transverse cut by a typical prior art log saw having an exemplary prior art log saw clamping assembly.

Further, as seen in FIG. 12, a collection 520 of finished products 500 typically bundled and packaged for sale to a customer can have a plurality of finished products 500, 500'. Further, at least two collections 520 of finished products 500 can be placed adjacent each other (such as on a shelf) to form an array of finished products 500. However packaged, each finished product 500 has a target height, H, and a core 510 having a target height, h. What is typically seen is that each finished product 500, 500' has a variety of actual heights H' and a core 510 having an actual height h'. For example, some cores 510, 510' of a collection 520 (or array) of finished products 500 may extend beyond the finished product 500, 500'. Conversely, some of the cores 510, 510' of the collection of finished products 520 may remain hidden within the inner confines of finished product 500, 500'.

Figure 13:
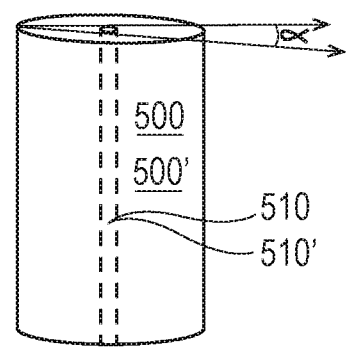

Further, as shown in FIG. 13, some of the finished products 500, 500' may have convolutely wound product that has been cut at an angle, a, relative to the transverse of finished product 500, 500'. Clearly, it would be preferred that each finished product be provided with ends that are cut transverse to the longitudinal axis of the convolutely wound log of web material L or finished product 500. Any off-quality product having any of the artifacts discussed supra can result in a collection 520 of finished products 500 that does not have an end that is completely orthogonal to the longitudinal axis of the convolutely wound log of web material L or finished product 500. This can result in stacks of collections 520 of finished products 500 being unplumb and leaning. A lack of structural integrity can cause problems during the stacking process, during transport of pallets of stacks of collections 520 of finished products 500, as well as the end purchaser of a stack of collections 520 of finished products 500 having the stack of collections 520 of finished products 500 collapse. Additionally, the end user of a finished product can readily observe any off-quality product during use. In any regard, this outcome is not optimal. The log saw clamps 110 of the present disclosure can reduce the occurrence of any of these non-optimal outcomes as discussed supra.

A review of target data for finished products 500 manufactured using prior art log saw clamp 110 technology discussed supra provided finished products 500 with a target length H of 11.08 inches had an actual length H' that ranged from 11.035 inches to 11.125 inches. This amounts to a relative error of 0.81% or a standard deviation, a, of about 0.045.

From a consumer (end user perspective) placing a finished product 500 into a standard wall-mounted paper towel roll holder, the extremes of this range can result in the finished product being too long or too short to be held in captive engagement with the wall-mounted paper towel roll holder or ends of rolls that are observably not orthogonal to the axis of rotation of the finished product 500. This is a clear negative that is observable by the end user and can result in rejection of the purchase of any future final product 500.

Thus, it is believed that the log saw clamp 110 of the present disclosure can reduce the overall variability observed in finished products 500, collections 520 of finished products 500, and arrays of collections 520 of finished products 500. Here, arrays of collections 520 of finished products 500 means at least two individual collections 520 of finished products 500 disposed in at least proximate engagement (and preferably in contacting engagement), such as would be observed in stacks of collections 520 of finished products 500 disposed upon the surface of a pallet or arrays of collections 520 of finished products 500 disposed in a side-by-side relationship as would be observed on a store shelf.

All publications, patent applications, and issued patents mentioned herein are hereby incorporated in their entirety by reference. Citation of any reference is not an admission regarding any determination as to its availability as prior art to the claimed invention.

The dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A log saw for cutting convolutely wound logs of web material, the log saw comprising:
   a) a cutting blade operating in a cutting plane;
   b) a log saw clamp for the retention of a convolutely wound log of web material such that the convolutely wound log of web material extends in a log advancing path through to the cutting plane; and,
   c) a controller operatively connected to said log saw clamp; and,
   d) wherein said log saw clamp comprises:
      1) A support structure, said support structure having a first and second cam disposed therein;
      2) a pair of opposed first and second paddles, said convolutely wound log of web material being disposable therebetween, each paddle of the pair of opposed paddles being capable of contacting engagement with a surface of said convolutely wound log of web material;
      3) a first and a second linkage, each of said first and second linkages comprising a first link and a second link, the second link having a cam follower disposed thereon, each cam follower of said first and second linkages being connectively and operatively engageable with said first and second cam, respectively, each of said first and second linkages being operatively and fixably connected to said first and second paddles, respectively, at a distal end of the first and second linkages;
      4) a bracket that is operatively coupled to each of said first and second linkages at the first link of each of the first and second linkages, such that application of a force to the bracket provides a substantially similar rectilinear motion to each of said first and second linkages;

wherein, the force applied to both of said first and second linkages causes each of said cam followers attached thereon to translate within said respective first and second cams disposed within said support structure, each of said cam followers causing said respective first and second linkage to cause said respective first and second paddles operably and fixably attached to said distal end thereof to translate relative to said convolutely wound log of web material;

wherein, when the force is in a first direction, said first and second paddles translate towards each other for contacting engagement with the surface of said convolutely wound log of web material;

wherein, when the force is in a second direction that is opposite the first direction, said first and second paddles translate away from each other and away from contacting engagement with the surface of said convolutely wound log of web material;

wherein said log saw clamp further comprises an axis of symmetry, said first cam, said first paddle, and said first linkage being disposed upon a first side of said axis of said symmetry and said second cam, said second paddle, and said second linkage being disposed on a second side of said axis of symmetry, such that a first concave portion of the first paddle and a second concave portion of said second paddle are disposed as to be capable of cooperatively and symmetrically contacting and supporting the convolutely wound log of web material between the first and second concave portions of the first and second paddles; and wherein the first and second cams are separate from each other and distanced from the axis of symmetry, wherein the first and second paddles are separate from each other and distanced from the axis of symmetry, and wherein said first and second linkages are separate from each other and distanced from the axis of symmetry, such that free space will exist immediately above and below the supported convolutely wound log of web material along the axis of symmetry.

2. The log saw of claim 1 wherein the force applied to said first and second linkages of said log saw clamp causes equal translation of said cam followers relative to said axis of symmetry.

3. The log saw of claim 1 wherein the force applied to said first and second linkages of said log saw clamp causes equal translation of each paddle of said pair of opposed paddles relative to said axis of symmetry.

4. The log saw of claim 1 further comprising a sliding cradle.

5. The log saw of claim 4 wherein said sliding cradle translates said convolutely wound log of web material from a position external to said log saw clamp to a position relative to, and intermediate, said pair of opposed first and second paddles.

6. The log saw of claim 4 wherein said sliding cradle translates said convolutely wound log of web material from a position relative to, and intermediate, said pair of opposed first and second paddles to a position external to said log saw clamp.

7. The log saw of claim 1 wherein each of said pair of opposed first and second paddles of said log saw clamp further comprise a curvature, said curvature providing cooperative contact of a each of said pair of opposed first and second paddles with the surface of said convolutely wound log of web material.

8. The log saw of claim 1 wherein each of said first and second linkages of said log saw clamp comprises a two bar linkage.

9. The log saw of claim 1 wherein said support structure of said log saw clamp further comprises said first and second cams provided at an incline relative to the axis of symmetry of said log saw clamp.

10. The log saw of claim 1 wherein said first and second linkages of said log saw clamp are each translatable from a first position to a second position, said first position for providing said respective first and second paddles in contacting engagement with a surface of said convolutely wound log of web material and said second position for providing said respective first and second paddles in non-contacting engagement with said surface of said convolutely wound log of web material.

11. The log saw of claim 1 wherein said first and second linkages of said log saw clamp are each translatable from a first position to a second position, said first position for providing said respective first and second paddles in non-contacting engagement with a surface of said convolutely wound log of web material and said second position for providing said respective first and second paddles in contacting engagement with said surface of said convolutely wound log of web material.

12. The log saw of claim 1 wherein said of said log saw clamp further comprises at least one actuator, said at least one actuator being capable of providing at least one of said first and second linkages of said log saw clamp with translational movement.

13. The log saw of claim 12 wherein said at least one actuator of said log saw clamp provides said first and second linkages of said log saw clamp with translational movement.

14. A log saw for cutting convolutely wound logs of web material, the log saw comprising:
a) a cutting blade operating in a cutting plane;
b) a log saw clamp for temporarily restraining a convolutely wound log of web material such that the convolutely wound log of web material extends in a log advancing path through to the cutting plane; and,
c) a controller operatively connected to said log saw clamp; and,
d) wherein said log saw clamp comprises:
a pair of opposed first and second paddles operatively connected to a respective first and a second linkage at a distal end of the first and second linkages, each of said first and second linkages comprising a first link and a second link, said convolutely wound log of web material being disposable between said pair of opposed first and second paddles, each paddle of the pair of opposed paddles being capable of contacting engagement with a surface of said convolutely wound log of web material, and a bracket that is operatively coupled to each of said first and second linkages at the first link of the first and second linkages, such that application of a force to the bracket provides a substantially similar rectilinear motion to each of said first and second linkages;
wherein, when the force is in a first direction, said first and second paddles translate towards each other for contacting engagement with the surface of said convolutely wound log of web material;
wherein, when the force is in a second direction that is opposite the first direction, said first and second paddles translate away from each other and away from contacting engagement with the surface of said convolutely wound log of web material;

wherein said log saw clamp further comprises a support structure, said support structure having a first and second cam disposed therein, and a cam follower disposed upon the second link of each of said first and second linkages, each said cam follower disposed upon each of said respective first and second linkages being disposed and translatable within a respective first and second cam, such that a first concave portion of the first paddle and a second concave portion of the second paddle are disposed as to be capable of cooperatively and symmetrically contacting and supporting the convolutely wound log of web material between the first and second concave portions of the first and second paddles; and wherein the first and second cams are separate from each other and distanced from an axis of symmetry, wherein the first and second paddles are separate from each other and distanced from the axis of symmetry, and wherein said first and second linkages are separate from each other and distanced from the axis of symmetry, such that free space will exist immediately above and below the supported convolutely wound log of web material along the axis of symmetry.

15. The log saw of claim 14 wherein said force applied to both of said first and second linkages of said log saw clamp causes each of said cam followers of said log saw clamp to translate within said respective first and second cams, each of said cam followers of said log saw clamp causing said respective first and second linkage to cause said respective first and second paddles to translate relative to said convolutely wound log of web material.

16. The log saw of claim 14 further comprising a sliding cradle, said sliding cradle translating said convolutely wound log of web material from a position external to said log saw clamp to a position relative to, and intermediate, said pair of opposed first and second paddles.

17. The log saw of claim 14 wherein said log saw clamp further comprises at least one actuator, said at least one actuator being capable of providing at least one of said first and second linkages with translational movement.

18. The log saw of claim 17 wherein said at least one actuator of said log saw clamp provides said first and second linkages with translational movement.

19. The log saw of claim 1, wherein said pair of opposed first and second paddles are operatively and fixably connected to said first and second linkage solely by a first single connection point between said first paddle and said first linkage, and a second single connection point between said second paddle and said second linkage.

20. The log saw of claim 1, wherein the translation of said first and second paddles resulting from the force is confined to rotational translation about an axis located proximately to a centroid of each of said cam followers.

21. The log saw of claim 20, wherein the rotational translation about the axis proximate to each of said cam followers prevents any change in elevation of said first paddle relative to said second paddle.

22. The log saw of claim 1, further comprising a first and second pressure sensor disposed in said first and second paddles and configured to generate a set of pressure data when said first and second paddles are in contacting engagement with the surface of said convolutely wound log of web material, wherein the controller is configured to:

determine a pressure exerted on the convolutely wound log of web material;

determine whether the convolutely wound log of web material is deformed by the contacting engagement based on the pressure; and where the convolutely wound log of web material is deformed, operate the clamping device to reduce the pressure exerted on the convolutely wound log of web material.

23. A log saw for cutting convolutely wound logs of web material, the log saw comprising:
a) a cutting blade operating in a cutting plane;
b) log saw clamp for the retention of a convolutely wound log of web material such that the convolutely wound log of web material extends in a log advancing path through to the cutting plane; and,
c) controller operatively connected to said log saw clamp; and,
d) wherein said log saw clamp comprises:
  1) A support structure, said support structure having a first and second cam disposed therein;
  2) a pair of opposed first and second paddles, said convolutely wound log of web material being disposable therebetween, each paddle of the pair of opposed paddles being capable of contacting engagement with a surface of said convolutely wound log of web material;
  3) a first and a second linkage, each of said first and second linkages having a cam follower disposed thereon, each cam follower of said first and second linkages being connectively and operatively engageable with said first and second cam, respectively, each of said first and second linkages being operatively and fixably connected to said first and second paddles, respectively, at a distal end of the first and second linkages;
  4) a bracket that is operatively coupled to each of said first and second linkages at the first link of the first and second linkages, such that application of a force to the bracket provides a substantially similar rectilinear motion to each of said first and second linkages;
  wherein, the force applied to both of said first and second linkages causes each of said cam followers attached thereon to translate within said respective first and second cams disposed within said support structure, each of said cam followers causing said respective first and second linkage to cause said respective first and second paddles operably and fixably attached to said distal end thereof to translate relative to said convolutely wound log of web material;
  wherein, when the force is in a first direction, said first and second paddles translate towards each other for contacting engagement with the surface of said convolutely wound log of web material;
  wherein, when the force is in a second direction that is opposite the first direction, said first and second paddles translate away from each other and away from contacting engagement with the surface of said convolutely wound log of web material;
  wherein the translation of said first and second paddles resulting from the force is confined to rotational translation about an axis located proximately to a centroid of each of said cam followers;
  wherein said log saw clamp further comprises an axis of symmetry, said first cam, said first paddle, and said first linkage being disposed upon a first side of said axis of said symmetry and said second cam, said second paddle, and said second linkage being disposed on a second side of said axis of symmetry, such that a first concave portion of the first paddle and a second concave portion of the second paddle are disposed as to be capable of cooperatively and symmetrically contacting and supporting the convolutely wound log of web material between the first and second concave portions of the first and second paddles; and wherein the first and second cams are separate from each other and distanced from the axis of symmetry, wherein the first and second paddles are separate from each other and distanced from the axis of symmetry, and wherein said first and second linkages are separate from each other and distanced from the axis of symmetry, such that free space will exist immediately above and below the supported convolutely wound log of web material along the axis of symmetry.

24. A log saw for cutting convolutely wound logs of web material, the log saw comprising:
a) a cutting blade operating in a cutting plane;
b) a log saw clamp for temporarily restraining a convolutely wound log of web material such that the convolutely wound log of web material extends in a log advancing path through to the cutting plane; and,
c) a controller operatively connected to said log saw clamp; and,
d) wherein said log saw clamp comprises:
a pair of opposed first and second paddles operatively connected to a respective first and a second linkage at a distal end of the first and second linkages, said convolutely wound log of web material being disposable between said pair of opposed first and second paddles, each paddle of the pair of opposed paddles being capable of contacting engagement with a surface of said convolutely wound log of web material, and a bracket that is operatively coupled to each of said first and second linkages at a proximal end of the first and second linkages, such that application of a force to the bracket provides a substantially similar rectilinear motion to each of said first and second linkages;

wherein, when the force is in a first direction, said first and second paddles translate towards each other for contacting engagement with the surface of said convolutely wound log of web material;

wherein, when the force is in a second direction that is opposite the first direction, said first and second paddles translate away from each other and away from contacting engagement with the surface of said convolutely wound log of web material;

wherein the translation of said first and second paddles resulting from the force is confined to rotational translation about an axis located proximately to a centroid of each of said cam followers;

wherein said log saw clamp further comprises a support structure, said support structure having a first and second cam disposed therein, and a cam follower disposed upon each of said first and second linkages, each said cam follower disposed upon each of said respective first and second linkages being disposed and translatable within a respective first and second cam, such that a first concave portion of the first paddle and a second concave portion of the second paddle are disposed as to be capable of cooperatively and symmetrically contacting and supporting the convolutely wound log of web material between the first and second concave portions of the first and second paddles;

wherein the first and second cams are separate from each other and distanced from an axis of symmetry, wherein the first and second paddles are separate from each other and distanced from the axis of symmetry, and wherein said first and second linkages are separate from each other and distanced from the axis of symmetry, such that free space will exist immediately above and below the supported convolutely wound log of web material along the axis of symmetry.

* * * * *